United States Patent
Agarwal et al.

(10) Patent No.: US 7,480,246 B2
(45) Date of Patent: Jan. 20, 2009

(54) CHARACTERIZING TRANSMISSION OF DATA SEGMENTS WITHIN A SWITCH FABRIC USING MULTIPLE COUNTERS FOR EACH DESTINATION NODE

(75) Inventors: Gaurav Agarwal, San Jose, CA (US); John T. Musacchio, Berkeley, CA (US); Jeonghoon Mo, Santa Clara, CA (US); Jean Walrand, Berkeley, CA (US)

(73) Assignee: Agere Systems Inc., Allentown, PA (US)

( * ) Notice: Subject to any disclaimer, the term of this patent is extended or adjusted under 35 U.S.C. 154(b) by 100 days.

(21) Appl. No.: 11/738,561

(22) Filed: Apr. 23, 2007

(65) Prior Publication Data
US 2007/0189283 A1 Aug. 16, 2007

Related U.S. Application Data

(63) Continuation of application No. 10/270,264, filed on Oct. 11, 2002, now Pat. No. 7,319,695.

(60) Provisional application No. 60/362,144, filed on Mar. 6, 2002.

(51) Int. Cl.
*H04L 1/00* (2006.01)
*H04L 12/56* (2006.01)
*G06F 15/16* (2006.01)

(52) U.S. Cl. .................... 370/235; 370/395.4; 370/412; 709/232

(58) Field of Classification Search ...... 370/229–238.1, 370/386–389, 395.2–395.43, 412–418; 709/223, 709/225, 231–236
See application file for complete search history.

(56) References Cited

U.S. PATENT DOCUMENTS 5,280,470 A 1/1994 Buhrke et al. .................. 370/13

(Continued)

FOREIGN PATENT DOCUMENTS

WO WO 00/64109 A1 10/2000

OTHER PUBLICATIONS

Adiseshu, Hari et al., "A Reliable and Scalable Striping Protocol" Department of Science, Washington University, St. Louis, MO 63130, USA, Aug. 1996, 11 pages.

(Continued)

*Primary Examiner*—Chi H. Pham
*Assistant Examiner*—Tri H. Phan
(74) *Attorney, Agent, or Firm*—Mendelsohn & Associates, P.C.; Steve Mendelsohn

(57) ABSTRACT

In one embodiment, data segments routed through a switch fabric are identified as being either a first or a second type. First and second counters are maintained for a destination node to characterize the transmission of data segments of the corresponding type within the switch fabric. For each first-type time period, all transmitted data segments are identified as being the first type. For each second-type time period, all transmitted data segments are identified as being the second type. The first- and second-type time periods are interleaved. The first counter is reset after termination of each first-type time period and the second counter is reset after termination of each second-type time period to correct for a possible error in characterizing the transmission of the data segments within the switch fabric during the corresponding time period.

22 Claims, 11 Drawing Sheets

U.S. PATENT DOCUMENTS

| | | | |
|---|---|---|---|
| 5,339,332 A | 8/1994 | Kammerl | 375/10 |
| 5,367,518 A | 11/1994 | Newman | 370/54 |
| 5,455,826 A | 10/1995 | Ozveren et al. | 370/60 |
| 5,475,682 A | 12/1995 | Choudhury et al. | 370/60 |
| 5,754,120 A | 5/1998 | Argentati | 340/876 |
| 5,859,835 A | 1/1999 | Varma et al. | 370/229 |
| 5,903,735 A | 5/1999 | Kidder et al. | 395/200.7 |
| 5,923,644 A | 7/1999 | McKeown et al. | 370/230 |
| 5,926,459 A | 7/1999 | Lyles et al. | 370/230 |
| 5,930,234 A | 7/1999 | Yoshida | 370/232 |
| 5,938,749 A * | 8/1999 | Rusu et al. | 710/54 |
| 5,946,297 A | 8/1999 | Calvignac et al. | 370/230 |
| 6,038,217 A | 3/2000 | Lyles | 370/233 |
| 6,064,650 A | 5/2000 | Kappler et al. | 370/232 |
| 6,064,651 A | 5/2000 | Rogers et al. | 370/233 |
| 6,064,677 A | 5/2000 | Kappler et al. | 370/414 |
| 6,075,791 A * | 6/2000 | Chiussi et al. | 370/412 |
| 6,078,585 A | 6/2000 | Kakuma et al. | 370/395 |
| 6,101,193 A | 8/2000 | Ohba | 370/429 |
| 6,134,217 A | 10/2000 | Stiliadis et al. | 370/232 |
| 6,345,040 B1 | 2/2002 | Stephens et al. | 370/232 |
| 6,359,861 B1 | 3/2002 | Sui et al. | 370/230 |
| 6,388,992 B2 | 5/2002 | Aubert et al. | 370/232 |
| 6,426,944 B1 | 7/2002 | Moore | 370/236 |
| 6,625,160 B1 * | 9/2003 | Suzuki | 370/413 |
| 6,683,884 B1 | 1/2004 | Howard | 370/412 |
| 6,721,273 B1 * | 4/2004 | Lyon | 370/235 |
| 6,765,906 B1 * | 7/2004 | Suzuki | 370/389 |
| 6,810,031 B1 | 10/2004 | Hedge et al. | 370/351 |
| 6,810,426 B2 | 10/2004 | Mysore et al. | 709/234 |
| 7,023,841 B2 | 4/2006 | Dell et al. | 370/388 |
| 7,023,857 B1 * | 4/2006 | Chiussi et al. | 370/395.4 |
| 7,072,345 B2 | 7/2006 | Siu et al. | 370/395.4 |
| 7,106,699 B2 | 9/2006 | Barri | 370/235 |
| 7,139,271 B1 | 11/2006 | Parruck et al. | 370/392 |
| 7,158,528 B2 * | 1/2007 | Dell et al. | 370/416 |
| 2002/0012340 A1 | 1/2002 | Kalkunte et al. | 370/360 |
| 2002/0012341 A1 | 1/2002 | Battle et al. | 370/378 |
| 2002/0131413 A1 | 9/2002 | Tsao et al. | 370/392 |

OTHER PUBLICATIONS

M. Shreedhar and G. Varghese, "Efficient Fair Queuing Using Deficit Round Robin," in Proceedings of ACM SIGCOMM'95, 1995, pp. 231-242.

C. Clos, "A Study of Non-Blocking Switching Networks," Bell System Technical Journal, Mar. 1953, vol. 32, No. 3, pp. 406-424.

Adiseshu, Hari, et al., "Reliable FIFO Load Balancing over Multiple FIFO Channels," WUCS-95-11, May 3, 1995, pp. 1-24.

Juniper Networks, Inc., "Supporting Differentiated Service Classes: Queue Scheduling Disciplines," 2001, pp. 1-27.

* cited by examiner

CHARACTERIZING TRANSMISSION OF DATA SEGMENTS WITHIN A SWITCH FABRIC USING MULTIPLE COUNTERS FOR EACH DESTINATION NODE

CROSS-REFERENCE

This is a continuation of U.S. patent application Ser. No. 10/270,264, filed on Oct. 11, 2002, now U.S. Pat. No.7,319,695 which itself claimed priority from U.S. Provisional Application No. 60/362,144, filed Mar. 6, 2002, the contents of both of which are incorporated herein by reference in their entirety.

U.S. patent application Ser. No. 10/269,928, entitled STRIPING ALGORITHM FOR SWITCHING FABRIC, by inventors Jean Walrand, John T. Musacchio, Roy T. Myers, and Chung Kuang Chin, filed on Oct. 11, 2002, is incorporated herein in its entirety.

BACKGROUND

1. Field of the Invention

The invention relates to packet-based switching fabrics, and more particularly to a load balancing method and apparatus for selecting an appropriate next-stage module for transmission of a data packet of variable size.

2. Description of Related Art

A switch fabric for a data network is a device that allows data from any of several input ports to be communicated switchably to any of several output ports. Early data networks were based on circuit switching, in which fixed routes were established through the fabric for each session. The peak bandwidth demand of each session was allocated to the route for the entire duration of the session. When session traffic was bursty, however, circuit switching resulted in under-utilization of network resources during the time between bursts. Packet switching was developed to overcome this disadvantage, thus improving the network utilization for bursty traffic.

Packet switched networks dynamically allocate bandwidth according to demand. By segmenting the input flow of information into units called "packets," and processing each packet as a self-contained unit, packet switched networks allow scheduling of network resources on a per-packet basis. This enables multiple sessions to share the fabric resources dynamically by allowing their packets to be interleaved across the fabric. Typically each packet includes a header indicating its destination port, and the fabric includes a routing mechanism for determining a route through the fabric, on a per-packet basis. The present invention is concerned primarily with a routing mechanism for packet switched networks rather than circuit switched networks.

Small switching fabrics can be constructed from crossbar switches, in which input ports are connected to the rows of a grid and the output ports are connected to the columns of the grid (or vice-versa). Each input port then can be connected to any output port merely by activating the switch at the grid junction at which they intersect. Multicast data flow can be supported just as easily, by turning on more than one junction switch to connect more than one output port to a single input port.

Crossbar switches do not scale well to larger fabrics. Many larger fabrics therefore use a multi-stage network topology, in which switching from a number of input ports to a number of output ports is accomplished through one or more intermediate stages. Each stage can have one or more module, each implementing its own internal switch. In addition, in a fully connected network, all of the modules in each stage of the network have respective communication paths to all of the modules in the next stage. A basic network of this sort has three stages (input, intermediate and output), but networks with any odd number of stages theoretically can be constructed by replacing the modules in any given stage with smaller multi-stage networks in recursive fashion.

A special case of multi-stage switch networks was studied by Clos in C. Clos, "A Study of Non-Blocking Switching Networks", Bell System Technical Journal, March 1953, vol. 32, No. 3, pp. 406-424, incorporated by reference herein. A so-called Clos network has three stages, any of which can be recursed to create effectively a network with a larger odd number of stages. All input stage modules (sometimes simply called "input modules") of the network have an equal number of input ports, all output stage modules (sometimes simply called "output modules") have an equal number of output ports, and all input and output modules are fully interconnected with all intermediate stage modules (sometimes simply called "intermediate modules"). Clos networks can be symmetric, in which case the number of modules and the number of ports per module on the input side match the corresponding values on the output side, or they can be asymmetric, in which case the number of modules or the number of ports per module on the input side do not necessarily match the corresponding values for the output side. A symmetric Clos network, therefore, can be characterized by a triple (m,n,r) where m is the number of modules in the intermediate stage, n is the number of input ports on each input module (the same as the number of output ports on each output module), and r is the number of modules in the input stage (the same as the number of modules in the output stage). An asymmetric Clos network must be characterized by a quintuple (m, $n_i$, $r_i$, $n_o$, $r_o$). The invention is most useful in Clos networks, but under proper circumstances it can also be used in multi-stage networks that do not strictly meet the definition of a Clos network.

Multi-stage networks scale better than pure crossbar switch networks, to a point, but also introduce the possibility of blocking operation. That is, because data from more than one input port have to share the same intermediate modules, a possibility exists that when data is ready for transmission, all possible routes to the output module having the desired destination output port might be blocked by other data flows. Theoretical formulas exist for calculating the minimum required number of intermediate stage modules and stage-to-stage data link rates in order to provide non-blocking operation given specified maximum input and output port numbers and data rates, but these minimum requirements are only necessary conditions; they are not necessarily sufficient by themselves to achieve non-blocking operation. Networks also must be designed to choose appropriate routes through the intermediate stage modules for individual data packets, and to backpressure them properly.

For example, consider a 3-stage Clos network having two input modules, two output modules, two input ports on each input module, and two output ports on each output module. Assume further that the maximum data rate per input port, the maximum data rate per output port, and the stage-to-stage link data rate, are all R. Then a necessary condition to non-blocking operation is that there be at least two intermediate stage modules. This can be seen because the total output capacity of a given one of the input modules would be 2R (R to each of the two intermediate stage modules), which is no less than the maximum total input data rate of the input module, which in this case is also 2R (R from each of the two input ports to the module). The same is true for every other module in the network. However, assume now the extreme case that the routing algorithm employed by a given one of the input modules is to always send all input packets to the first intermediate stage module and never to the second. In this case, since the data rate from an input module to a single intermediate stage module is only R, the fabric will be able to transport only half the combined data rate that was promised to the two input ports of that module, and the fabric will have to block packets from one or the other or both of such input ports whenever their combined input data rate exceeds R.

The algorithm used by an input module to decide which intermediate module to send the next packet to is known variously as a load balancing, channel balancing, or striping algorithm. Much research has been conducted into optimum load balancing algorithms. Many of the algorithms apply only to the older circuit switched networks, but many others apply to packet switched networks. The algorithms applicable to packet switched networks are the ones of interest in the present discussion.

It will be appreciated that striping algorithms are different from "fair queuing" algorithms, or queue scheduling algorithms, the purpose of which are to select which of a plurality of non-empty input queues the next packet is to be taken from for transmission across the fabric. Typically an input module requires both kinds of algorithms: a fair queuing algorithm to determine which input queue to service next, and then a striping algorithm to determine how to route the next packet from the input queue chosen by the fair queuing algorithm. A duality does exist between the two kinds of algorithms, but only in certain circumstances can a fair queuing algorithm be converted directly to a load balancing algorithm or vice versa. For example, whereas it might be desired to formulate a striping algorithm that will achieve certain goals under a particular set of striping conditions, there may be no useful dual of such a striping algorithm in the fair queuing arena because there is no useful dual of the goals or set of conditions in the fair queuing arena. In such a situation, it might not be intuitive that direct conversion of any known fair queuing algorithms will be optimal as a load balancing algorithm under the set of conditions for which a striping algorithm is being developed.

A good striping algorithm should be able to minimize the probability of blocking operation while utilizing all of the available channels in proportion to their respective capacities. One way to achieve these goals might be through the use of a global supervisor that is continually aware of queue lengths in all channels, and uses this information to choose the best route for the next packet. This solution does not scale well, however, for a number of reasons. First, as the number of input and output ports grow, and channel data rates increase, it becomes increasingly difficult to design logic circuitry that is fast enough to make all the required calculations in time for each packet. Second, it also becomes increasingly difficult to design in sufficient control signal capacity to transmit the information from all the various queues in the network back to the supervisor. The latter problem is only exacerbated when the various ports, queues and routes are spread out over multiple chips, boards or systems.

Because of these problems, a number of different striping algorithms have been developed for three-stage networks which do not require direct knowledge of downstream queue lengths. These algorithms therefore avoid (or at least reduce the amount of) control signaling required across the network. Because these algorithms rely on probabilities rather than deterministic calculations, they achieve the goals of non-blocking operation and fair channel usage with varying degrees of success in different circumstances.

In one such algorithm, known as round robin (RR) striping, packets are sent from the input stage to the intermediate stage modules in a round-robin order. This algorithm is generally simple to implement, but it does not take account of different bandwidth capacities available on different channels. For switching fabrics having different capacities on different channels, a weighted round robin (WRR) striping algorithm is known, in which during each round robin cycle, the number of packets transmitted on each channel is proportional to the capacity of that channel.

Round robin and weighted round robin striping algorithms, however, do not optimize load balancing when the packet size is variable. As an example, consider a Clos network having two modules in the intermediate stage, equal data rates on all channels, and a sequence of packets to send which alternate in size between large and small. In this case an input module implementing a round-robin striping algorithm will alternate striping between the two intermediate stage modules and will do so synchronously with the packet size. All the large size packets will therefore be sent through one of the intermediate stage modules (call it intermediate stage module #1) while all the small size packets will be sent through the other intermediate stage module (call it intermediate stage module #2). The algorithm therefore does not maximally utilize all of the available channels in proportion to their respective capacities. Nor does it ensure non-blocking operation, because the input module might have to hold up large size packets in its output queue for intermediate stage module #1, even though the route through intermediate stage module #2 might be clear. Still further, if the traffic is not well balanced across the links, then some links may be oversubscribed, i.e., presented with traffic whose rate exceeds that of the link. In the event that this imbalance persists for long enough, the node that oversubscribes the link can accumulate excess traffic until it overflows and is forced to drop packets.

In order to address issues of variable packet size, a striping algorithm known as deficit round robin (DRR) has been developed. DRR striping is described for example in H. Adiseshu, G. Parulkar, and G. Varghese, "A Reliable and Scalable Striping Protocol," in Proceedings of ACM SIG-COMM '96, pp. 131-141 (1996), incorporated by reference herein. According to the DRR algorithm, a credit count is maintained for each channel. Before packets are sent on a current channel, a quantum is added to the credit count for that channel. If channel capacities differ, then the quantum for each channel can be proportional to the relative capacity of that channel (Deficit Weighted Round Robin—DWRR). Then, if the length of the packet is smaller than the credit count for the current channel, then the packet is sent on that channel and the credit counter for that channel is reduced by the length of the packet. The sender continues sending packets on the current channel, concomitantly reducing the credit count for that channel, until the length of the next packet to send is greater than the credit count for the current channel. The sender then moves on to the next channel in round robin sequence, adds the quantum to the credit count for the new channel, and tests the count against the length of the new packet. As with RR and WRR, DRR and DWRR algorithms can be implemented in a distributed manner to improve scalability.

It will be appreciated that the DRR algorithm can be expressed in a number of different ways while still achieving the same or approximately the same packet striping sequence. For example, instead of comparing credit counts with packet lengths, the determination of whether to send the next packet on the current channel can be made simply on the basis of whether the credit count for that channel is greater than (or no less than) some fixed threshold, such as zero. Other examples will be apparent.

Both round robin and weighted round robin striping algorithms achieve the goals of non-blocking operation and fair channel usage best when the algorithm can be implemented with fixed size packets, globally across all input queues. Similarly, DRR and DWRR striping algorithms also are most successful when the algorithm can be implemented globally across all input queues. In many kinds of fabrics, however, the input queues are distributed across multiple input modules. Coordination among the input queues becomes more and more difficult as the number of input modules increases, thereby stifling the scalability of the network. In this case a fabric might be designed in which each input module implements its own striping algorithm, without coordinating with the other input modules. This solution, however, leaves open a risk that two or more input modules will synchronize. Synchronization can be problematical especially in the context of a multistage switch fabric, in which multiple senders share common data paths for part of the route to each destination (e.g. the part of the route from the intermediate stage module to the output module).

As an extreme example, consider a DRR fabric having 16 ingress modules, 16 egress modules and 5 intermediate stage modules fully interconnected to all the ingress and egress modules. Ignoring any speedup that might be incorporated into the fabric, assume that each data path internal to the fabric has a data rate of R and each fabric ingress and egress port has a data rate of 4R. The minimum conditions for non-blocking operation are satisfied in such a fabric, since five parallel routes of data rate R to a given destination should together be able to handle an input data rate of 4R to the same destination. But assume that the traffic arriving on the first ingress module consists of packets destined for egress modules 1, 2, 3, 4, 5, 1, 2, 3, 4, 5, and so on in perpetual rotation. Assume further that the traffic arriving on each of the second through fifth ingress modules have the same sequence of destinations, and that at the time this traffic pattern begins, all five of such ingress modules have their DRR pointer pointing to the first channel. Assume further that all packets have equal size, so that DRR reduces to simple RR. In this situation, then, all five of the ingress modules will send their packets destined for egress module i via intermediate module i, where i=1, 2, 3, 4, 5, 1, 2, 3, . . . . Each i'th intermediate module thus receives data from each of the five ingress modules at a rate of 4R/5, for a total rate of data received by the intermediate module of 4R. All the data received by intermediate stage module i is destined for egress module i. But the maximum data rate between any intermediate stage module and any egress module is only R, so the fabric overall will be able to transport data at a rate of only R from each ingress module, which represents only 25% utilization (again, ignoring any speedup). It can be seen, therefore, that the unmodified DRR striping algorithm can lead to a blocking fabric with a utilization that is far below 100%, at least in the event of synchronization.

Other deficit-based striping algorithms are also known. As one example, each next packet is striped to whichever route has carried the fewest total number of bytes so far. This technique might succeed at evenly distributing the traffic across multiple routes all originating from one input module, but does not avoid problems of synchronization among multiple input modules. It can be seen, in fact, that if all incoming traffic has a fixed packet size, and depending on the algorithm used to break ties among more than one of the routes, this technique reduces essentially to conventional round robin striping.

Another known striping algorithm involves striping all packets in a strict pseudorandom sequence. This technique might successfully avoid synchronization among multiple input modules if the seeds in each module can be sufficiently randomized, but precludes the determination of a theoretical bound on the differences in channel usage at any point in time. Such a bound is important for limiting the maximum difference in latencies among all the channels, and therefore the amount of re-ordering memory required at the output ports of the system.

Accordingly, there is an urgent need for a switch fabric architecture that can achieve full throughput and maximum channel usage, with either fixed or variable size data packets. As an important part of achieving this goal, there is an urgent need for a new striping algorithm that can be implemented in a distributed manner, that will not bog down due to synchronization, and that permits determination of an upper bound on channel usage differences at any point in time. Furthermore, it would be extremely desirable that the striping algorithm be simple enough to integrate into a small space on an integrated circuit chip, so that it can be used on every ingress line card of a very large packet switching system.

SUMMARY OF THE INVENTION

According to certain embodiments of the invention, data segments are routed through a switch fabric from one or more source nodes of the switch fabric to a destination node of the switch fabric. Each data segment is identified as being one of at least two different segment types, and each identified data segment is transmitted within the switch fabric from one of the one or more source nodes to the destination node. At least two counters are maintained for the destination node, one counter for each different segment type, where each counter characterizes the transmission of identified data segments of the corresponding segment type within the switch fabric. For each of a plurality of first-type time periods, all data segments transmitted within the switch fabric are identified as being of a first type, and a corresponding first-type counter characterizes the transmission of the first-type data segments within the switch fabric. For each of a plurality of second-type time periods, all data segments transmitted within the switch fabric are identified as being of a second type, and a corresponding second-type counter characterizes the transmission of the second-type data segments within the switch fabric. The first-type time periods are interleaved with the second-type time periods. The first-type counter is reset after termination of each first-type time period to correct for a possible error in characterizing the transmission of the first-type data segments within the switch fabric during the first-type time period. The second-type counter is reset after termination of each second-type time period to correct for a possible error in characterizing the transmission of the second-type data segments within the switch fabric during the second-type time period.

BRIEF DESCRIPTION OF THE DRAWINGS

The invention will be described with respect to specific embodiments thereof, and reference will be made to the drawings, in which.

DETAILED DESCRIPTION

1. System Overview

Figure 2:
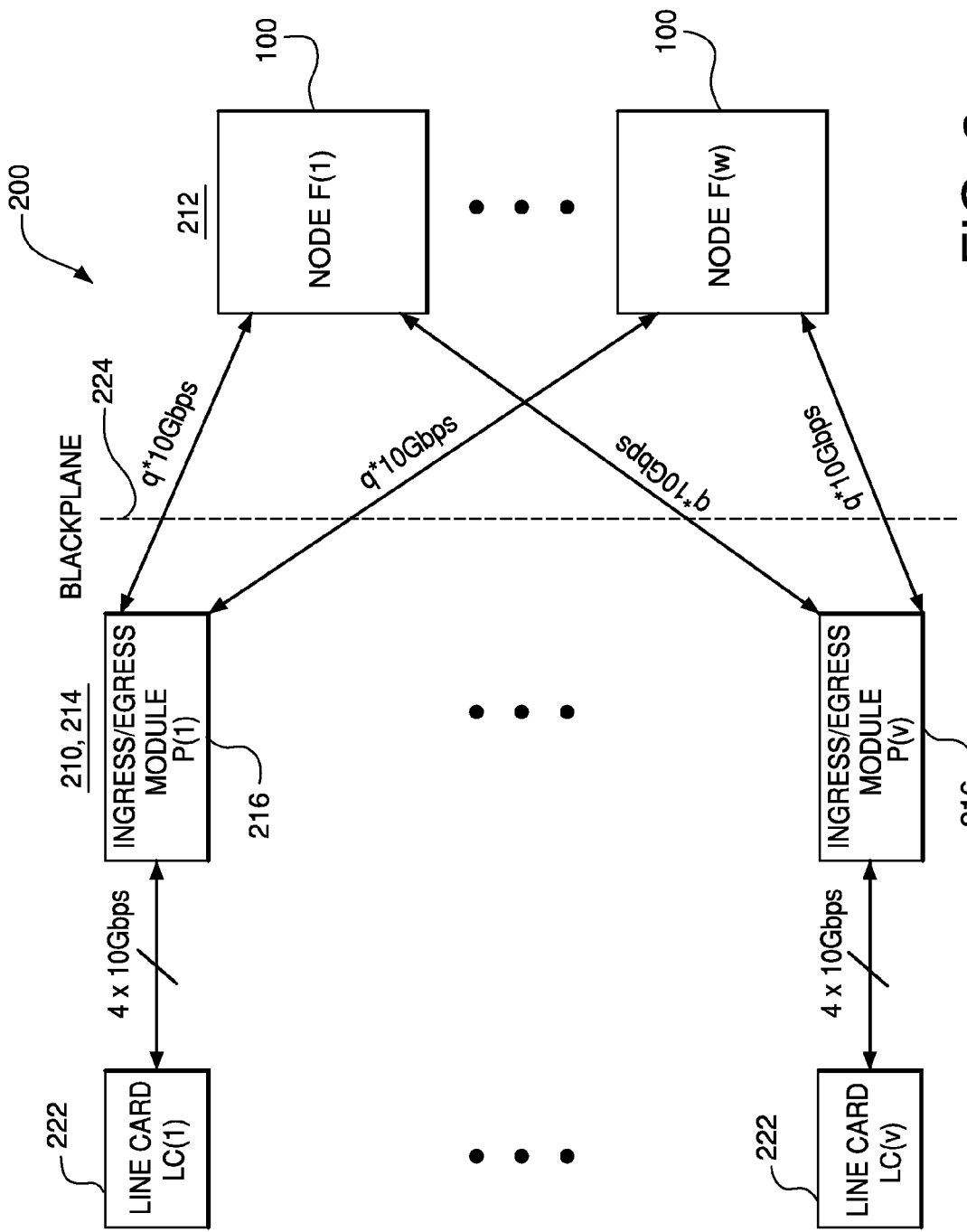
FIG. 2 is a functional block diagram of pertinent components of a switching system incorporating features of the invention.

FIG. 2 is a block diagram of a modular switching system 200 incorporating the invention. The system of FIG. 2 has three stages: an ingress stage 210, an intermediate stage 212 and an egress stage 214. The switching system 200 is shown in a folded topology, in which each egress node shares an integrated circuit chip with a corresponding ingress node in a one-to-one correspondence. Because of the folded nature of the topology of FIG. 2, each node 216 performs both ingress functions and egress functions. A node 216 therefore may be referred to herein variously as an ingress node 216, an egress node 216 or an ingress/egress node 216, whichever is most appropriate in the context of the discussion. Any or all of the nodes can implement its switching function internally by using a crossbar switch, one or more recursive levels of 3-stage sub-networks, or by any other structure. The ingress stage 210 of the system has v ingress/egress modules 216, numbered P(1) through P(v). The system also includes v bidirectional line cards 222, numbered LC(1) through LC(v). Each ingress/egress module 216 has one bidirectional I/O port adapted for exchanging data with one corresponding line card 222. In practice the data path between a line card and its corresponding ingress/egress module includes four closely matched data links, each carrying one-fourth the total data rate of the port (10 Gbps each for a total of 40 Gbps in each direction per port). Not every line card needs to use all four data links, in which case the total system utilization will be less than the maximum that it can handle.

The intermediate stage 212 has w nodes 100, numbered F(1) through F(w). Each ingress/egress module 216 has q 10 Gbps bidirectional link(s) to each intermediate stage node 100, across a backplane 224. In general, there is no requirement that the data rates of any of the routes through the system be the same. The intermediate stage nodes 100 have multicast capability, but that is not required in a different embodiment.

The system of FIG. 2 is a (w,1,v) symmetrical Clos network, but the general principles of the invention will also work with asymmetrical Clos networks, networks which are not fully interconnected, networks in which not all of the ingress nodes have an equal number of ingress ports and/or not all egress nodes have an equal number of egress ports, and so on. The general principles of the invention will also work with generalized networks of all kinds for which multiple routes are available to a destination node, whether or not they can be organized into stages. Clos networks are preferred, however, because their throughput properties are easier to analyze and prove theoretically. Clos networks are preferred also because they are easier to build in a modular fashion. In particular, all of the ingress/egress modules 216 are identical, sometimes referred to herein as Pashmina integrated circuit chips.

Additionally, all of the intermediate stage nodes 100 are identical. In an embodiment, each of the intermediate stage nodes 100 in the topology of FIG. 2 is a 1-stage switching fabric (sometimes referred to herein as a C fabric, for reasons described below). In another embodiment, each intermediate stage node includes a 3-stage switching subnetwork (sometimes referred to herein as a CCC fabric). Example fabrics are described hereinafter. In an embodiment, each Pashmina chip can connect bidirectionally with up to 4 switching fabrics 100, or 5 if 4:1 redundancy is desired (w<=5). Additionally, each fabric 100 can connect bidirectionally with up to 128 Pashmina chips 216 (128 line cards 222) (v<=128), depending on the topology internal to the fabric 100. Furthermore, each data path between a Pashmina chip 216 and a fabric segment 100 can include up to 4 links at 10 Gbps net data rate each. All told, a large number of different topological variations can be implemented using only Cashmere and Pashmina integrated circuit chips. Examples of some of the topologies that can be implemented are set forth in Table I. Additional 1:1 redundancy can be achieved by using two complete parallel systems.

TABLE I

| # of 40 G Line Cards (v) | # of Fabric Segments (w) | # of 10 Gbps links between each Pashmina and Fabric Segment | Fabric Kind (C/CCC) | Fabric Segment Throughput (in Gbps) | Redundancy | Overall Net System Throughput (Gbps) |
|---|---|---|---|---|---|---|
| 4 | 1 | 4 | C | 160 | none | 160 |
| 8 | 2 | 2 | C | 160 | none | 320 |
| 16 | 5 | 1 | C | 160 | 4:1 | 640 |
| 16 | 2 | 2 | CCC | 320 | none | 640 |
| 32 | 5 | 1 | CCC | 320 | 4:1 | 1280 |
| 32 | 4 | 1 | CCC | 320 | none | 1280 |
| 32 | 2 | 2 | CCC | 640 | none | 1280 |
| 64 | 5 | 1 | CCC | 640 | 4:1 | 2560 |
| 64 | 4 | 1 | CCC | 640 | none | 2560 |
| 64 | 2 | 2 | CCC | 1280 | none | 2560 |

TABLE I-continued

| # of 40 G Line Cards (v) | # of Fabric Segments (w) | # of 10 Gbps links between each Pashmina and Fabric Segment | Fabric Kind (C/CCC) | Fabric Segment Throughput (in Gbps) | Redundancy | Overall Net System Throughput (Gbps) |
|---|---|---|---|---|---|---|
| 128 | 5 | 1 | CCC | 1280 | 4:1 | 5120 |
| 128 | 4 | 1 | CCC | 1280 | none | 5120 |

The system of FIG. 2 transports fixed size frames, or alternatively transports variable-size frames—from a few bytes to more than 10,000 bytes ("jumbo")—without losses. The system supports three classes of service: Time-Sensitive (TS), Bandwidth-Provisioned (BProv), and Best-Efforts (BE), but the striping algorithm implemented in the Pashmina chips 216 do not distinguish among them. Instead this algorithm considers all incoming frames as being of a single class. A different embodiment could distinguish among different classes if the benefits of doing so outweigh the costs for the particular application. The striping algorithm implemented in the fabrics 100, however, do distinguish between the three classes of service. They switch Time-Sensitive frames with the highest priority, and in the absence of Time-Sensitive traffic, they transport Bandwidth-Provisioned frames, and then Best-Efforts frames. When suitably policed by the line cards 222 upstream of the fabric, frames are transported across the fabrics 100 with short latency. The fabrics 100 also guarantee a minimum bandwidth to the stream of Bandwidth-Provisioned frames between each input/output pair of line cards. The fabrics 100 switch Best-Effort frames with the maximum throughput possible given the topology of the fabric. In particular, the fabrics 100 can be non-blocking with an appropriate topology. That is, they each can sustain any set of rates that do not saturate fabric 100 output ports. In addition, the fabrics 100 support multicast with the maximum possible throughput.

As mentioned, data incoming to the system of FIG. 2 belong to one of the three predefined classes of data. In some embodiments the data classes correspond to classes of service, but other embodiments can distinguish data classes according to other kinds of principles. In one particular embodiment, all incoming data is considered to be of a single data class for purpose of the Pashmina striping algorithm, even though they might be of several classes "of service." In embodiments in which the Pashmina chips do distinguish between classes for the purpose of the striping algorithm, they can make their internal routing decisions independently (or substantially independently) for each class of data. In addition, though one embodiment uses the same load balancing algorithm for each class of data, another embodiment can use different load balancing algorithms for data of different classes.

As used herein, the term "packet" refers to a variable size protocol data unit generated according to any protocol. A "block" of data is considered herein to refer to a packet that has a fixed length. A block, therefore, as used herein, is a special case of a packet. A "data segment", as used herein, implies nothing more than a segment of data. Thus it is generic to packets, blocks, frames, cells, and portions thereof, and any other grouping of data of any length, fixed or variable. A "frame" is a data segment being processed through the particular fabric described herein, and in particular may include both a packet as well as additional header information needed only while the packet is within the fabric. In some embodiments the header information may change as the frame progresses through the fabric.

The backplane 224 10 Gbps data links between the Pashmina chips 216 and the fabrics 100, at a physical level, each comprise six parallel 2.5 Gbps serial connections. The total data rate afforded by these connections is 15 Gbps in each direction, which is 10 Gbps plus speedup and fabric framing overhead. Each Pashmina chip 216 includes a SERDES (serializer/deserializer) function at its backplane ports in order to transmit and receive data on the serial connections. Each of the switching fabrics 100 include a complimentary SERDES function (not shown) at each of its backplane ports. Preferably other Pashmina chips are used at the backplane ports of the fabrics 100, with all functions disabled or bypassed except the SERDES functions. The Pashmina chips at the backplane ports of the fabrics 100 are not shown in the figures herein because they do not play a role in the system architecture and are not necessary for an understanding of the invention. Thus the system of FIG. 2 can include a very large number of Pashmina chips. Whereas the hardware cost of implementing a sophisticated striping algorithm in the individual Cashmere ingress chips internal to the fabrics 100 can be amortized over all the I/O ports supported by each such chip, the large number of Pashmina chips in the system of FIG. 2 demand a striping algorithm that can be implemented with lower cost. The algorithm described herein can achieve nearly the same striping performance at such a reduced cost. In addition, since the striping mechanisms of the system of FIG. 2 are distributed across all the Pashmina chips 216, the system does not require a separate global striping manager, thereby greatly improving scalability.

Returning to FIG. 2, in an example system, v=32 and w=4. The Pashmina chips 216 are designed to support a net input/output data rate of 40 Gbps in each direction with its corresponding line card 222, plus a speedup less fabric framing overhead. A necessary condition to full throughput (non-blocking operation), therefore, is that the data links between the ingress/egress nodes 216 and the intermediate stage nodes 100, as well as the data links between the intermediate stage nodes 100 back to the ingress/egress nodes 216, each support a net data rate of 10 Gbps. Another necessary condition to full throughput, however, is that the striping algorithm that the ingress/egress nodes 216 use to select an appropriate intermediate node 100 for each incoming data segment be satisfactory. An innovative and unique striping algorithm that achieves this goal is described herein. The algorithm distributes traffic evenly across the fabric to avoid hot spots. The striping algorithm is implemented independently in each of the Pashmina chips 216, although in another, less preferred embodiment, it could be implemented globally over the ingress input stage 210.

2. Pashmina Ingress Node

Figure 3:
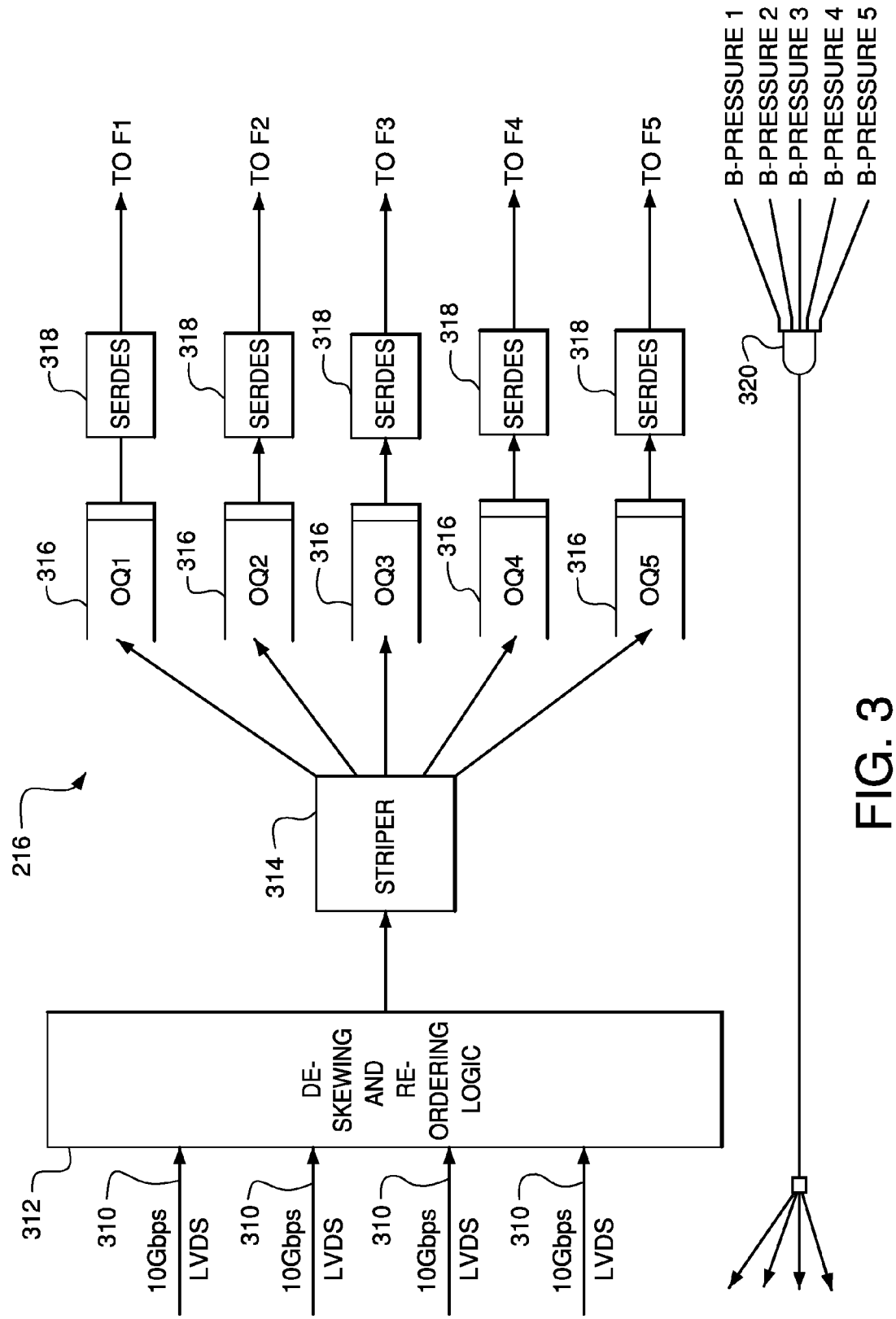
FIG. 3 is a functional block diagram of pertinent components of an ingress node of the fabric of FIG. 2.

FIG. 3 is a functional block diagram showing pertinent ingress functions of one of the Pashmina ingress/egress nodes 216 (FIG. 2). The Pashmina chip itself may be located physically on the line card that it serves, but for the purposes of the discussion herein it is considered separate. In this diagram, as well as in other functional diagrams herein, certain functional units are illustrated as being upstream or downstream from other functional units in a data path. As will be apparent, however, many of the processing elements in the diagram can be interchanged in sequence, or performed by indirect manipulation of the data path rather than as part of it. Other processing elements not shown in the diagrams also can be inserted at various points in the data path. These diagrams are intended only to illustrate functions performed, not the sequence or structure by which they are performed.

As mentioned, the line-card port of the node connects to the circuitry of a single line card 222 via four data links 310 of 10 Gbps each net data rate. Including speedup and framing overhead, the actual data rate of each link 310 is 15 Gbps. Each of the data links 310 is a source-clocked low voltage differential signaling (LVDS) bus. The four data links are independent from each other but are designed to have very similar propagation delays. A small skew due to unbalanced delay paths in the source device routing, packaging, PC board traces, and so on, is accommodated in the Pashmina chip 216. The line card—Pashmina interface can be used in the following modes:

40 Gbps Mode: Double data rate clocking; aggregates all four data links

20 Gbps Mode: Double data rate clocking; aggregates two data links

10 Gbps Mode A: Double data rate clocking; uses only a single data link

10 Gbps Mode B: Single data rate clocking; aggregates two data links.

Referring to FIG. 3, data arrives from the line card 222 via links 310 as frames of variable length. These frames are transmitted by the line card so that they are received in order, or nearly in order, by the Pashmina chip 216. The striping algorithm used by the line card 222 to accomplish this is not important for an understanding of the present invention. The four data links 310 are provided to de-skewing and re-ordering logic 312 which contains a small amount of data memory and performs any de-skewing and frame re-ordering that might be required due to slightly unequal propagation delays. The logic 312 also fragments any jumbo frames into frames having the maximum size transportable by the switching fabric 100, and manipulates the incoming data depending on the interface mode so as to provide a single data stream at its output. Each sub-frame of a jumbo frame is treated thereafter as an independent frame and striped accordingly.

The output of de-skewing and re-ordering logic 312 is provided to a striper 314, described in more detail hereinafter. The striper 314 determines frame-by-frame, which one of the five output ports (four output ports in systems not using the fifth) should carry each next frame that arrives from the de-skewing and re-ordering logic 312, and writes the frame into an output queue 316 associated with the chosen port. Eventually the transmit port logic associated with each port reads the frame data out from the head of the corresponding output queue and transmits it across backplane 224 to the corresponding switching fabric 100 via a respective SERDES 318.

Each of the five output ports in the Pashmina/Fabric interface also has a corresponding control port in the opposite direction operating at 2.5 Gbps. Backpressure signals, including those generated by the feedback-based memory protection scheme described hereinafter, are received on these control ports. The ingress Pashmina 216 does not act on these backpressure signals, nor does it generate any backpressure signals of its own. Instead it merges together in merger block 320 all the backpressure signals that it receives from different fabrics 100 for the same data stream and forwards them to the line card 222 as a single combined backpressure signal. The line cards 222 contain queue memory to stop and start backpressured flows.

3. Intermediate Stage Fabrics

Figure 1:
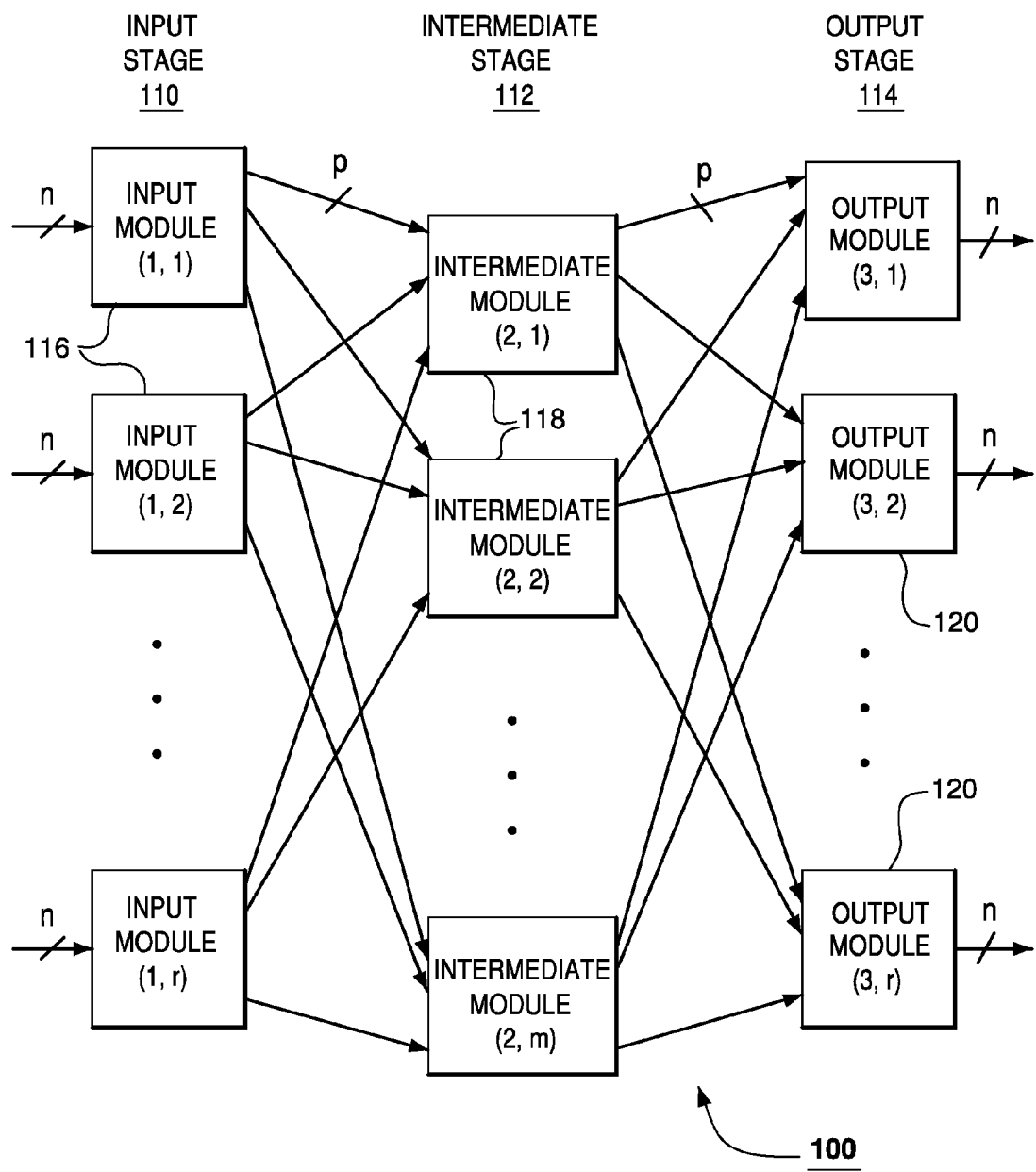
FIGS. 1, 1A, 1B, 1C and 1D are functional block diagrams of various fabrics of FIG. 2.

FIG. 1 is a block diagram of one of the switch fabrics 100. The fabric 100 itself has three stages: an input stage 110, an intermediate stage 112 and an output stage 114. These stages are also sometimes referred to herein as the first, second and third stage, respectively, of the fabric 100. The fabric is illustrated in FIG. 1 with a flat topology, but as with the overall system topology of FIG. 2, it could equally well be illustrated in folded form. Physically, the folded topology is preferred. As with the overall system of FIG. 2, any or all of the modules in fabric 100 can implement its switching function internally by using a crossbar switch, one or more recursive levels of 3-stage sub-networks, or by any other structure. The input stage 110 of the fabric has r input modules 116, numbered (1,1) through (1,r), and each input module 116 has n input ports. Since the topology of FIG. 2 is fully interconnected, v=rn/q. Each input module 116 also has mp output ports. The intermediate stage 112 has m modules 118, numbered (2,1) through (2,m). The number of data links from each input module 116 to each intermediate stage module 118 is p. Alternatively, a different embodiment can implement only one data link from each input module 116 to each intermediate stage module 118, but with a capacity of p times the capacity of each fabric input port. Each intermediate stage module 118 includes rp input ports and rp output ports. The output stage 114 of the fabric has r output modules 120, numbered (3,1) through (3, r). Each output module 120 has mp input ports and n output ports. Each input and output pair of ports in FIG. 1 corresponds to a respective one of the bidirectional 10 Gbps data paths between an ingress/egress node 216 and a fabric 100 in FIG. 2.

The fabric of FIG. 1 is itself an (m,n,r) symmetrical Clos network, but as in the overall system, the general principles of the invention will also work with intermediate stage fabrics 100 that are asymmetrical Clos networks, networks that are not fully interconnected, networks in which not all of the input modules have an equal number of input ports and/or not all output modules have an equal number of output ports, and so on. In an embodiment, all of the modules 116 in the input stage 110 of the fabric of FIG. 1 are identical; all of the modules 118 in the intermediate stage 112 of the fabric of FIG. 1 are identical; and all of the modules 120 in the output stage 114 of the fabric of FIG. 1 are identical. Preferably, in fact, all of the modules in all of the stages of the fabric of FIG. 1 are fabricated from identical integrated circuit chips, sometimes referred to herein as Cashmere chips, which are designed to include all of the features required for any stage of the fabric. The chip is configured as an input module 116, an intermediate stage module 118 or an output module 120, by pin strapping or programming, depending on the stage at which the particular chip is deployed in the fabric 100.

Non-blocking multicast fabrics 100 with 8 to 128 input and output ports and various topologies can be built with Cashmere integrated circuit chips. Using the companion Pashmina integrated circuit chip, up to five such fabrics can be connected in parallel as shown in FIG. 2 to build fabrics with 4 to 128 40 Gbps input and output ports and optional 4:1 redundancy. Blocking architectures with a larger throughput can also be designed.

Figure 1A:
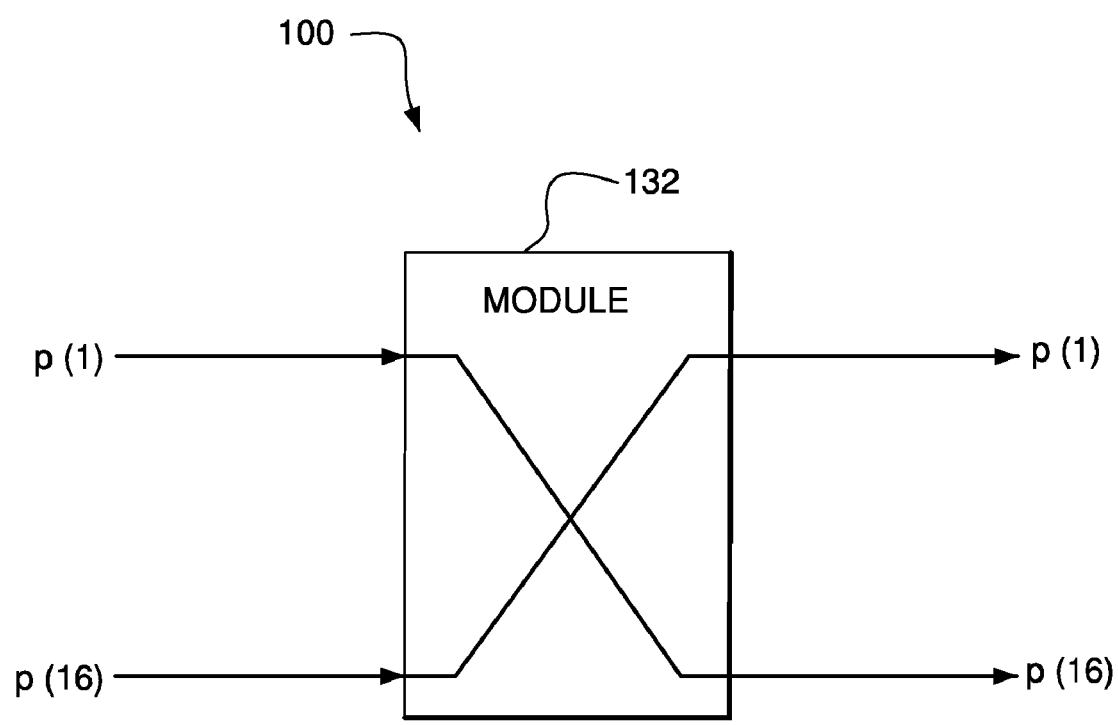

FIG. 1A, for example, shows a fabric 100 that contains only one Cashmere module 132. The module has 16 bidirectional ports, each of which is connected bidirectionally to a respective Pashmina module (not shown in FIG. 1A). As mentioned, this fabric is sometimes referred to herein as a C fabric, reflecting the fact that traffic passes through only one Cashmere integrated circuit chip. If each I/O port of the fabric supports a net data rate of 10 Gbps in each direction, then the overall fabric a FIG. 1A has a net data throughput of 160 Gbps.

Figure 1B:
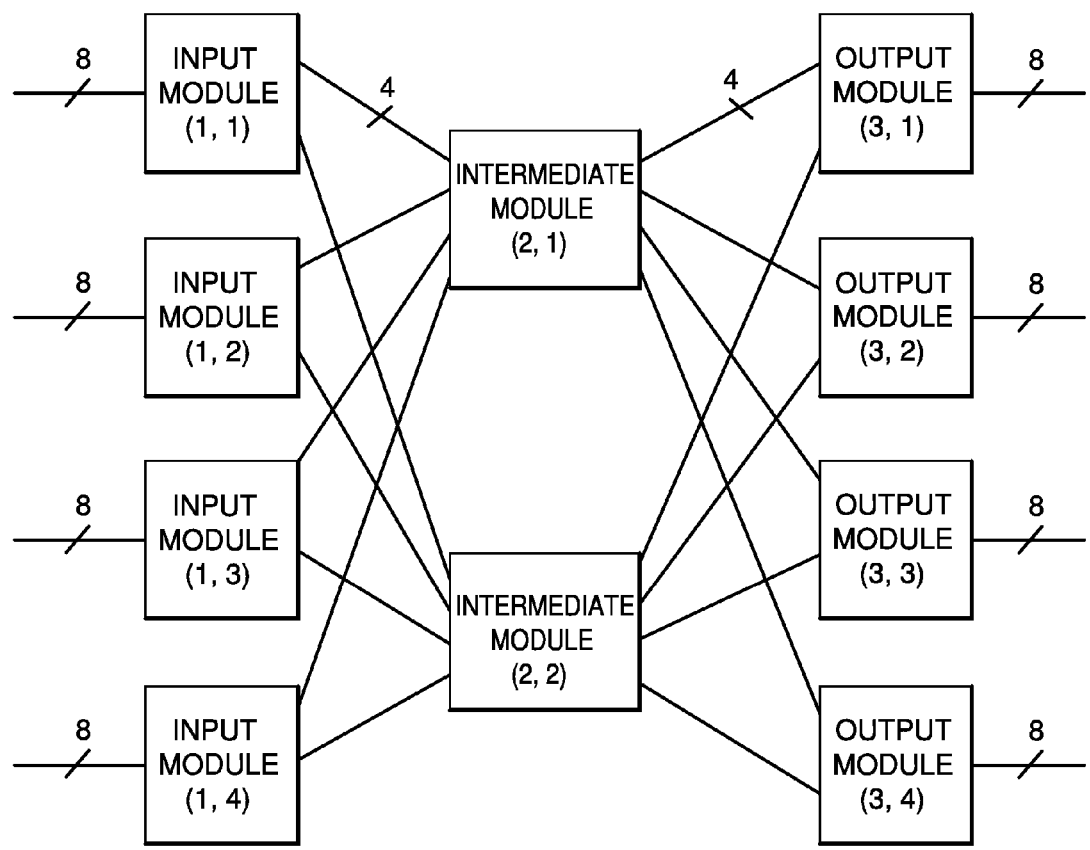

FIG. 1B illustrates a three-stage fabric made using 10 modules organized as four input modules (r=4), two intermediate stage modules (m=2) and four output modules. In the folded topology, the 10 modules can be concentrated onto six chips (four input/output chips and two intermediate stage chips). Each input module has eight input ports, and each output module has eight output ports (n=8). Each input module has four parallel data links to each intermediate stage module, and each intermediate stage module has four parallel data links to each output module. The topology is shown in FIG. 1B in flat form for clarity of discussion and illustration, but it will be understood that the discussion could equally well apply to an equivalent folded topology. Folded topologies provide certain known advantages over flat topologies. Other topologies are illustrated herein either in their folded or flat forms as convenient, and it will be understood that the accompanying discussions apply equally to the form not shown. The topology of FIG. 1B supports up to 32 bidirectional ports, each connected to a respective Pashmina and line card (not shown in FIG. 1B). If each port supports a net data rate of 10 Gbps in each direction, then the overall fabric of FIG. 1B has a net data throughput of 320 Gbps.

Figure 1C:
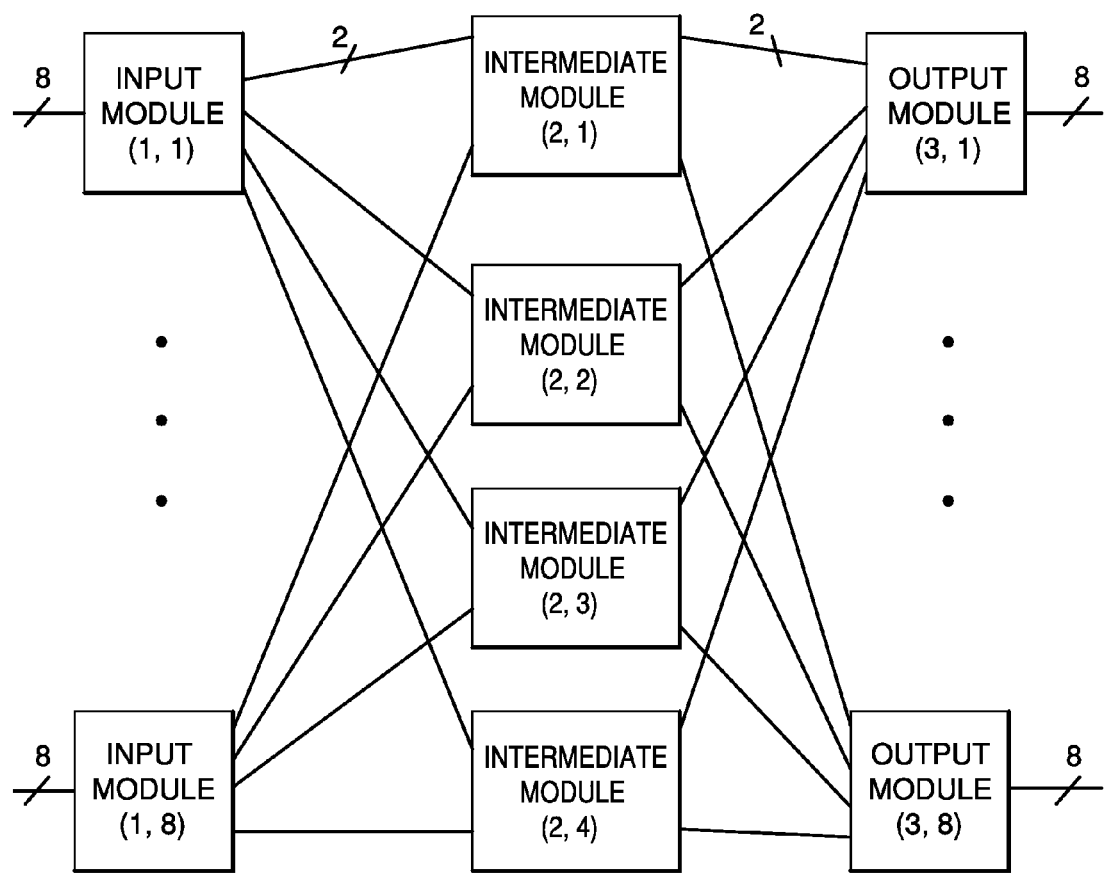

FIG. 1C illustrates yet another topology which can be formed using Cashmere modules. This topology includes eight input modules (r=8), eight output modules, and four intermediate modules (m=4). In a folded topology these 20 modules can be concentrated onto only 12 chips. Each input module has eight input ports, and each output module has eight output ports (n=8). Each intermediate module has two data links to each of the input modules and to each of the output modules (p=2). This topology supports up to 64 input line cards and 64 output line cards, or in a folded equivalent topology, it supports 64 bidirectional line cards (not shown in FIG. 1C). If each port of the fabric supports the net data rate of 10 Gbps in each direction, then the overall fabric of FIG. 1C has a net data throughput of 640 Gbps.

Figure 1D:
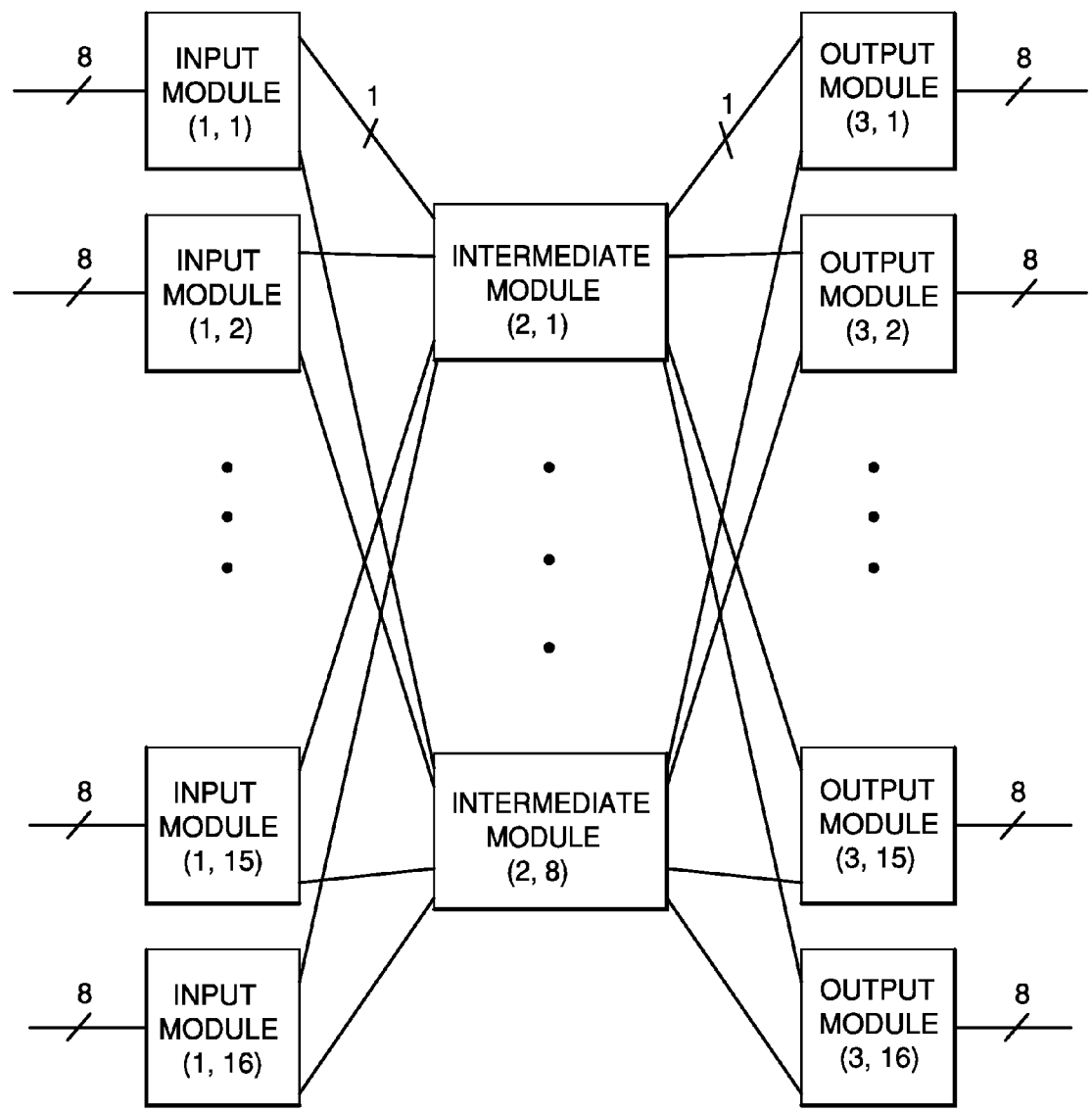

FIG. 1D illustrates still another topology which can be formed using Cashmere modules. This topology includes 16 input modules, 16 output modules (r=16), and eight intermediate stage modules (m=8) (24 chips in a folded topology). Each input module has eight input ports, and each output module has eight output ports (n=8). Each intermediate module has only one data link to each of the input modules and to each of the output modules (p=1). This topology supports up to 128 input line cards and 128 output line cards, or in an equivalent folded topology, it supports 128 bidirectional line cards (not shown in FIG. 1D). If each port of the fabric supports the net data rate of 10 Gbps in each direction, then the overall fabric of FIG. 1D has a net data throughput of 1.28 Tbps.

All of the 3-stage topologies for fabric 100 (e.g. FIGS. 1B, 1C and 1D) are sometimes referred to herein as CCC fabrics, as previously mentioned, reflecting that data flows through three Cashmere integrated circuit chips as it progresses through the fabric. The overall topology of FIG. 2 is sometimes referred to herein as a PCCCP topology, because data passes through a Pashmina chip, a CCC network, and then a Pashmina chip as it progresses across the system. In general, the system topology is sometimes referred to herein as a PFP topology, where the fabric (F) segment can be a C fabric, a CCC fabric, or another fabric supplied by the same or a different manufacturer. Preferably 3-stage fabrics in a PFP system use a so-called Min. Sum striping algorithm internally to the fabric. The Min.Sum striping algorithm is described in the related patent application and incorporated by reference herein. The various technologies for fabric 100 are made possible in part by the distributed nature of this striping algorithm. While the Min.Sum striping algorithm is preferred, the invention will work with fabrics that use a different internal striping algorithm. Preferably, though the fabric should achieve non-blocking operation at the full data rate of the input ports. The fabric of FIG. 1A does not itself require the use of the striping algorithm internally to the fabric.

Although the modules of FIGS. 1 and 2 are in one embodiment implemented as separate integrated circuit chips (or two modules combined onto one chip, in the case of the input/output chips in a folded topology), as used herein, the term "module" is not intended to require this. As the term is used herein, several "modules" can exist on a single chip or single card, or one module can span multiple chips or cards. Where one module spans multiple chips or cards which themselves are also "modules", the chips or cards spanned may sometimes be referred to herein as "sub-modules".

a. Fabric Input Stage Module

Figure 4:
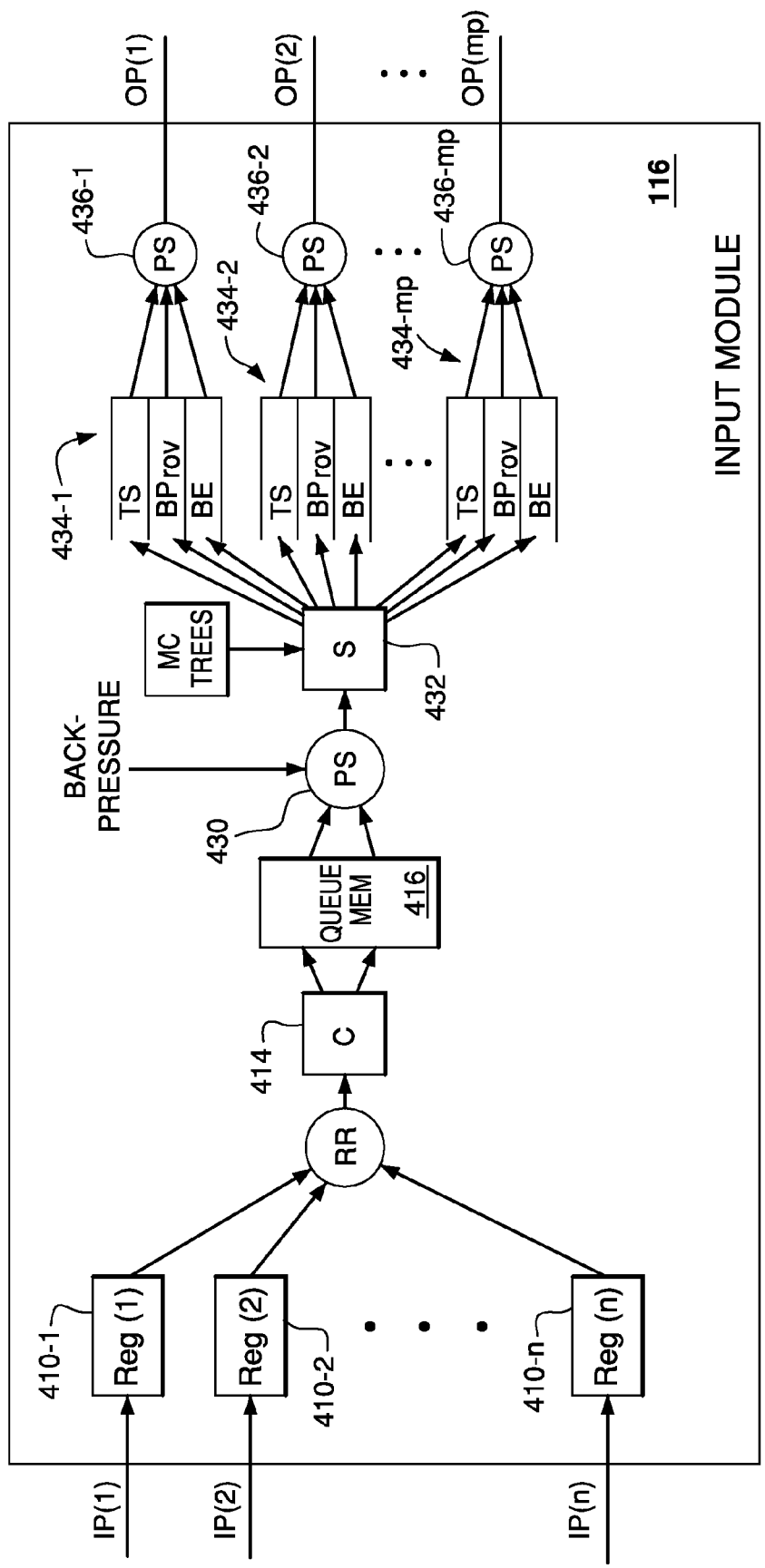
FIG. 4 is a functional block diagram of pertinent components of one of the input modules in FIG. 1.

FIG. 4 is a functional block diagram of pertinent components of one of the Cashmere input modules 116 in a 3-stage fabric 100 (FIG. 1). Variable sized frames arrive on the input ports 1-$n$ and are placed into input registers 410-1 through 410-$n$ (collectively 410). The input registers 410 are served in round-robin order, and the frames are classified in a classifier 414 and sent to one of a number of queues, all stored in a queue memory 416. The queue memory 416 maintains the following queues, for example as virtual queues stored as linked lists in the memory. In an alternative embodiment, each queue can occupy its own separate memory or its own pre-allocated region of a shared memory. In either case, preferably the queues described herein contain only descriptors of the data segments they represent. The data itself is stored in a common memory.

n time sensitive (TS-class) queues (one for each input port of the module)

n×r bandwidth provisioned-Unicast (BProv-class unicast) queues (one for each fabric output port)

n bandwidth provisioned-Multicast (BProv-class multicast) queues (one for each module input port)

n×r best efforts-Unicast (BE-class unicast) queues (one for each fabric output port); and n best efforts-multicast (BE-class multicast) queues (one for each module input port).

As an example, in a fabric 100 which includes 16 input modules 116, 16 output modules 120 and 8 ports per input/output module (n=8, r=16), each input module 116 includes a total of 304 queues: 8 time sensitive queues, 128 bandwidth provisioned-unicast queues, 8 bandwidth provisioned-multicast queues, 128 best efforts-unicast queues and 8 best efforts-multicast queues. The multiplicity of queues are provided to implement a fair queuing algorithm, incorporating for a scheduling among the different classes, and per-thread flow control for bandwidth provisioned class traffic and best efforts traffic. Not all queues are used in every topology.

A priority scheduler 430 chooses the next frame for striping from the input module 116, from among all the queues in queue memory 416 that are neither empty nor backpressured. The priority scheduler 430 chooses the next frame according to the following algorithm, which might be performed serially or in parallel in various embodiments, or partially serially and partially in parallel:

1. Choose a class:
   The class is chosen in priority order: TS, BProv, then BE. If the TS queue is non-empty and non-backpressured, then the TS class is chosen. Otherwise, if any BProv queue (unicast or multicast) is non-empty and not backpressured, then the BProv class is chosen. Otherwise, if any BE queue (unicast or multicast) is non-empty and not backpressured, then the BE class is chosen. Otherwise, repeat the test in the same order until a queue is found that is non-empty and not backpressured.
2. Within the chosen class, choose a casting type (unicast/multicast):
   If the chosen class is one that supports multicasting (BProv or BE in the present embodiment), then the casting type is also chosen in priority order: unicast then multicast. If any unicast queue of the chosen class is non-empty and not backpressured, then Unicast is chosen. Otherwise, Multicast is chosen. (In an alternative embodiment, the choice between unicast and multicast is made by a WRR scheduler).
3. Within the chosen class and casting type, choose an individual queue using DRR scheduling. In another embodiment, the individual queue choice can be made using DWRR scheduling.

Once the priority scheduler 430 determines the queue from which to take the next frame, a striper 432 uses a striping algorithm to determine along which of the mp possible routes through the fabric to send the chosen frame. The details of the striping algorithm are described in the above-incorporated parent patent application. The input module then places the frame that is at the head of the queue chosen by the priority scheduler 430, into the input module 116 transmit port queue 434-1 . . . 434-mp (collectively 434) for the route chosen by the striper 432. As used herein, a "route from the input module" is considered to begin immediately after the striping function, even though the packet might still be physically within the same integrated circuit chip. Each output port of the input module 116 has associated therewith three transmit queues, one per class of service. In one embodiment, all of the transmit queues 434 share a common memory, with the data being stored in a linked list manner as in the input module 116. In another embodiment, bandwidth limitations require each of the transmit queues to be allocated a separate memory or separate region of memory. The transmit queues 434 preferably store only descriptors of the data segments to be transmitted. The data itself remains in queue memory 416 until all required copies of the data segment have been read out the output ports.

The transmit queues 434 are provided because once the striper identifies the next packet to send out on a given output port, the module might not be able to transmit the selected packet immediately. For example, it is possible for the striper 432 to stripe two consecutive packets to the same transmit port. In this case the transmit queue for that output port will hold the second packet until the first packet leaves. If instead the striper were to hold the second packet back, by pausing the striping operation, other transmit ports may go idle. So the striper continues selecting next packets and placing their descriptors into the appropriate transmit queues until there are a few packets in each transmit queue, or more accurately, until one of the transmit queues reach a threshold depth. If the striping algorithm is balancing well, then the other transmit queues should have a similar depth as the longest transmit queue. The striper resumes selecting next packets when the transmit queues fall below a lower threshold.

Once an output port is ready to transmit a packet whose descriptor has been placed in the associated transmit queue 434, a priority scheduler 436-1 . . . 436-mp (collectively 436) associated with the output port selects the next packet to transmit on its associated output port, from among the three class-of-service-based transmit queues 434 associated with that output port, in strict priority order. That is, if the time sensitive queue associated with the output port is non-empty, then the priority scheduler selects the head packet in the time sensitive queue. If not, and if the bandwidth provisioned queue associated with the output port is non-empty, then the priority scheduler selects the head packet in the bandwidth provisioned queue. Only if both the time sensitive queue nor the bandwidth provisioned queue associated with the output port are empty, will the priority scheduler selects the head packet in the best efforts queue associated with the output port.

Once the transmission of packet data out the output port begins, with one exception, the transmission continues until the frame is completed. The exception occurs if a TS frame becomes available in the same transmit queue 434 that is already transmitting a bandwidth provisioned frame or a best efforts frame. A TS frame can interrupt a BProv or BE frame, on a block boundary, after only part of it has been sent. The interruption of a frame does not affect operation of the striping algorithm because all frames represented in the particular transmit queue 434, regardless of class of service, are already destined for the same route.

As used herein, a striper is considered to have "sent" a packet when it has completed its work with respect to that packet. In the module of FIG. 4, this occurs when the descriptor of the striped packet has been placed into the appropriate transmit queue 434.

b. Fabric Intermediate Stage Module

Figure 5:
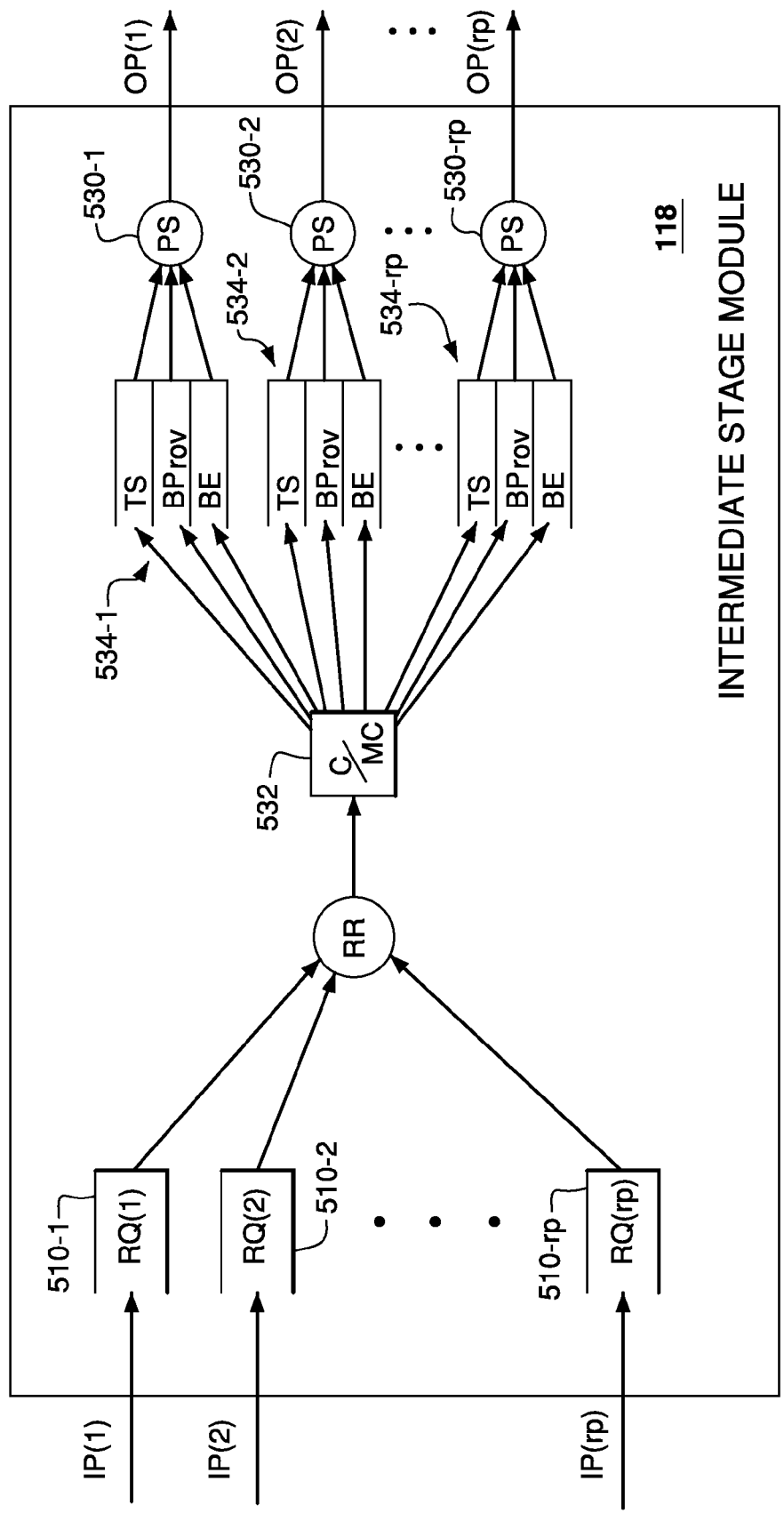
FIG. 5 is a functional block diagram of pertinent components of one of the intermediate stage modules in FIG. 1.

FIG. 5 is a functional block diagram of pertinent components of one of the intermediate stage modules 118. Frames arrive to the intermediate stage module 118 on the input ports 1-rp and are placed into receive queues 510-1 through 510-rp (collectively 510). As mentioned, in topologies in where p>1, several of the input ports are connected to the output ports of a single one of the input modules 116. The receive queues 510 are served in round-robin order, and the frames are classified and forwarded by a classifier and multicast copier 532 to the appropriate one or ones of a bank of transmit queues 534-1 . . 534-rp (collectively 534). Each output port of the intermediate stage module 118 has associated therewith three transmit queues, one per class of service. In one embodiment, all of the transmit queues 534 share a common memory, with the data being stored in a linked list manner. In the present embodiment, however, bandwidth limitations require each of the transmit queues 534 to be allocated a separate memory or separate region of memory. Also, the transmit queues 534 preferably store only descriptors of the data segments, with the data segments themselves being held in a common memory. Thus the intermediate stage module 118 contains rp time sensitive transmit queues, rp bandwidth provisioned transmit queues, and rp best efforts transmit queues, for a total of 3rp separate data queues. It will be appreciated that since the integrated circuit chip is designed for use in a wide variety of topologies, a given topology might not utilize all rp input ports or rp output ports. The full quantity of rp input ports and rp output ports nevertheless exist in the module so as to be available for topologies that do require them.

The intermediate stage module 118 also includes priority schedulers 530-1 ... 530-rp (collectively 530), one for each of the output ports of the intermediate stage module 118. As with the per-port priority schedulers 436 in the input module 116, each priority scheduler 530 selects the next packet to transmit on its associated output port, from among the three transmit queues 534 associated with that output port, in strict priority order.

No sophisticated striper is needed in the intermediate stage module 118, because no complex routing choices exist in the intermediate stage. By the time a frame reaches the intermediate stage 112, there is only one route to the frame's destination output port (to each of the frame's destination output ports, in the case of multicast): via the output port connected to the particular output module 120 that contains the desired output port. The intermediate stage module 118 does include a striper (not shown), but it is very simple and comes into play only in topologies that include more than one data link from a fabric input module to an intermediate stage module and from an intermediate stage module to a fabric output module (p>1). In particular, a one-to-one correspondence is made between data links incoming to the intermediate stage module 118 and data links outgoing from the intermediate stage module 118. The striper in the intermediate stage module then always sends a frame out the outgoing data link that corresponds to the data link on which it was received from an input module.

This rule not only simplifies the intermediate stage striper, but also simplifies the reordering problem in the fabric 100 output modules. If one allows packets to traverse all possible pairings of links (pair of $1^{st}$-$2^{nd}$ stage and $2^{nd}$-$3^{rd}$ stage links), the number of paths via a particular middle stage device to a particular output device would be $p^2$ rather than p. Packets that traverse the same path cannot "pass" each other. So the reorder problem is made easier by constraining the packets to as few paths as possible, but still having enough paths to have sufficient bandwidth. This is achieved by having a one to one mapping between the p incoming links from any first stage device to the p outgoing links to any third stage device.

c. Fabric Output Stage Module

Figure 6:
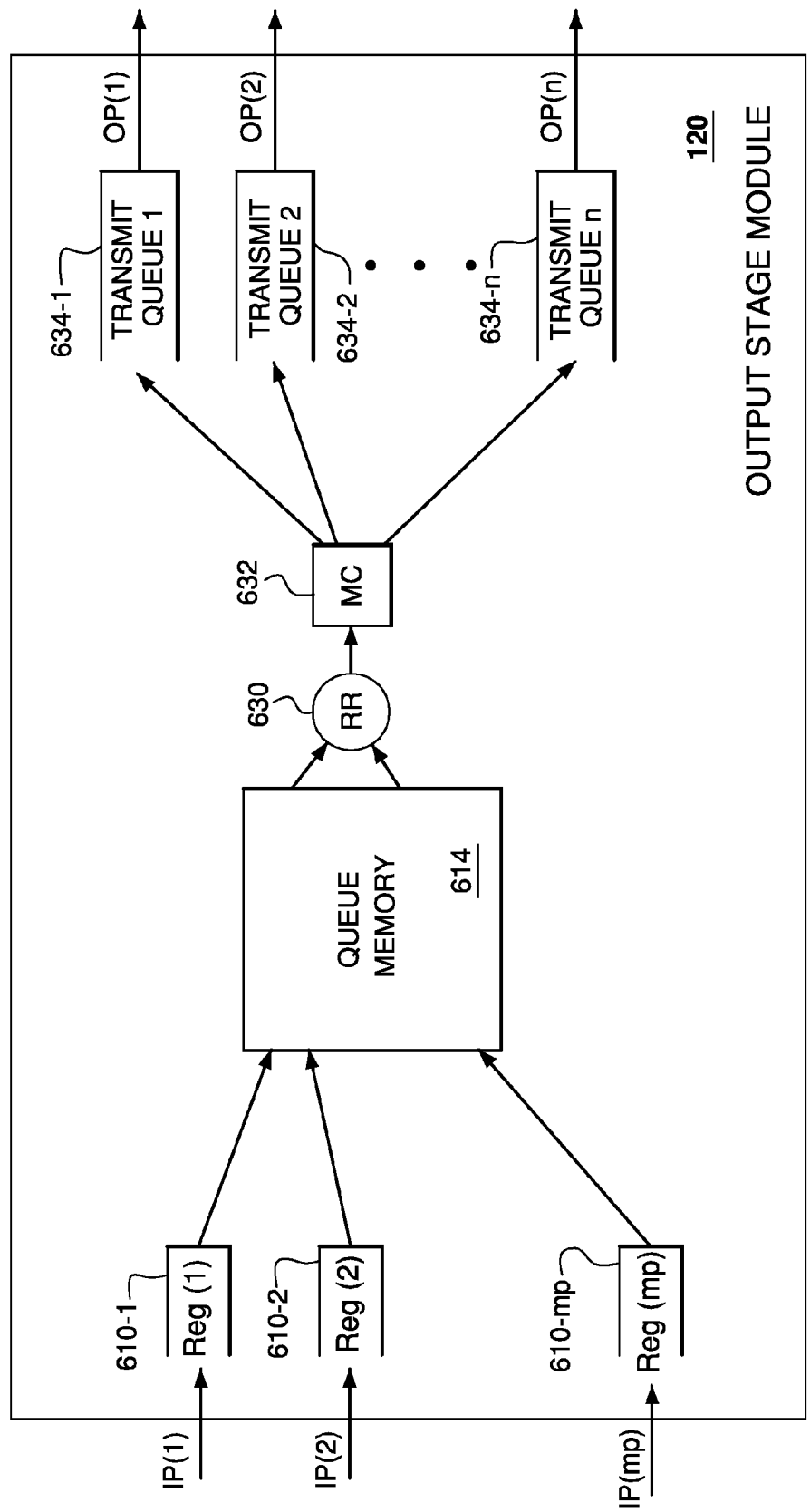
FIG. 6 is a functional block diagram of pertinent components of one of the output modules in FIG. 1.

FIG. 6 is a functional block diagram of pertinent components of one of the output modules 120. As with the input stage modules 116, frames arrive to the output module 120 on input ports (1-mp) and are placed into input registers 610-1 through 610-mp (collectively 610). In topologies where p>1, several of the input ports are connected to output ports of a single one of the intermediate stage modules 118. The input registers 610 are served in round-robin order, and the frames are re-ordered as necessary into queue memory 614. Any appropriate re-ordering algorithm can be used; its details are unimportant for an understanding of the present invention.

The output module 120 also includes a round robin scheduler 630 which selects each next frame in a round robin fashion from among all the eligible queues in queue memory 614. Once the next frame is chosen, a multicast copier 632 performs any multicast copying required by the frame and copies the frame out into the appropriate one or ones of the n transmit queues 634-1 through 634-n (collectively 634) for transmitting on the modules output ports. Like the input module 116 and the intermediate stage module 118, the transmit queues 634 in the output module 120 is divided by class of service and is followed by a per-port priority scheduler (not shown in FIG. 6).

4. Pashmina Egress Node

Figure 7:
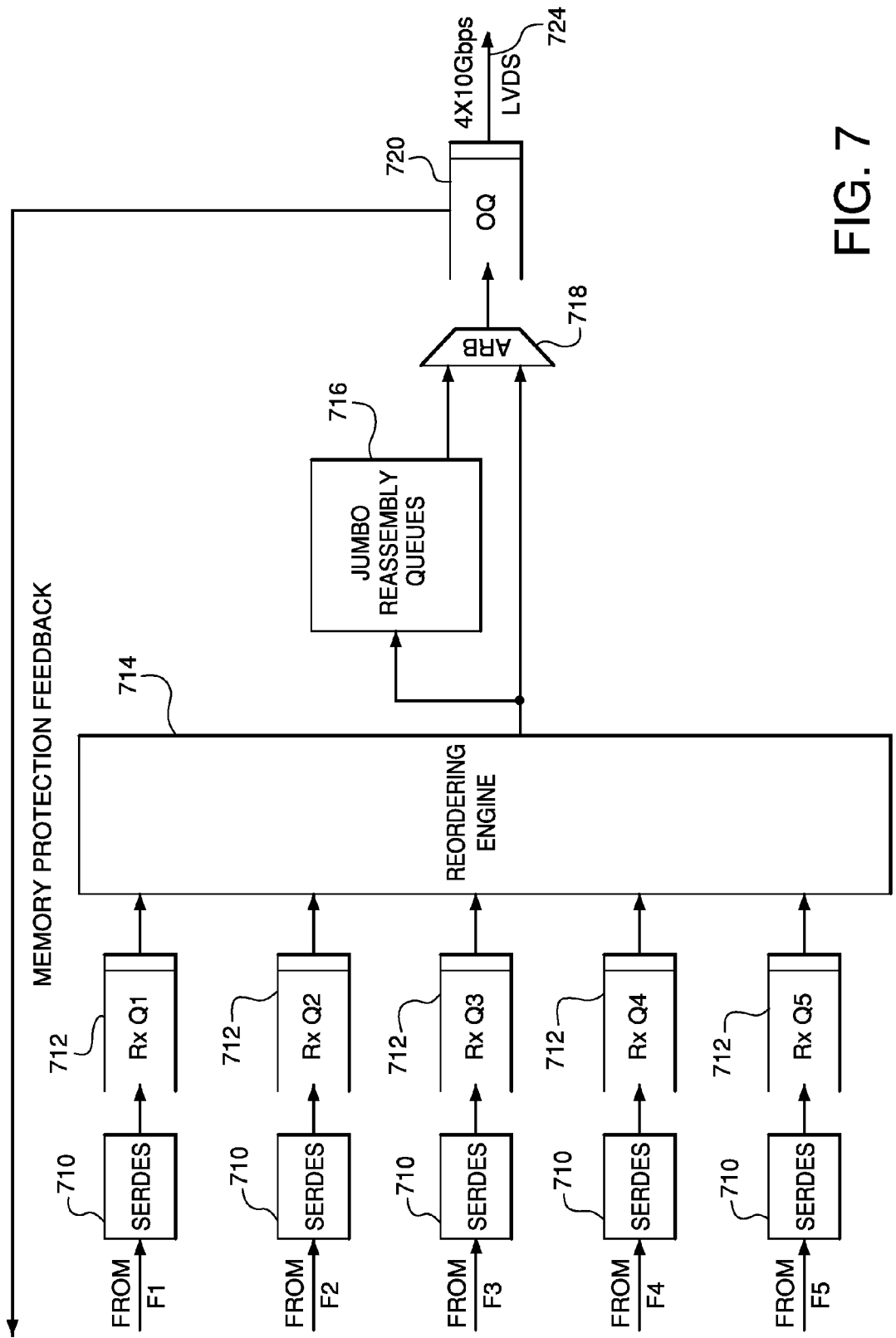
FIG. 7 is a functional block diagram of pertinent components of an egress node of the fabric of FIG. 2.

FIG. 7 is a functional block diagram showing pertinent egress functions of one of the Pashmina ingress/egress nodes 216 (FIG. 2). Data frames arrive from each of the fabrics 100 and are converted in respective SERDES blocks 710 for use within the egress Pashmina 216. The frames are written to respective receive queues 712, and then sent to an appropriate queue in a reordering engine 714. After reordering, any jumbo frames are reassembled in jumbo reassembly queues 716, and an arbiter 718 chooses frames from either the reordering engine 714 or the jumbo reassembly queues 716 for writing into an output queue 720. Frames from the head of the output queue 720 are forwarded to the egress line cards via four 10 Gbps LVDS data links 724 similar to the data links 310 at the ingress Pashminas (FIG. 3). The striping algorithm used for writing frames to these four data links is the same as the one used on the data links 310. The output queue 720 also sends memory protection feedback signals, discussed below, via an upstream control path to each of the intermediate stage fabrics 100. In addition, downstream line cards 222 also can assert their own backpressure signals, and these are also sent on the upstream control path back toward the ingress nodes.

5. System Level Striping and Flow Control

The objective of striping is to balance the data flows through the system of FIG. 2, and the algorithm described herein does so fairly, scalably, and with extremely minimal risk of synchronization among ingress nodes 216. In addition, a novel egress module memory protection mechanism can in many cases guarantee sufficient reordering memory to avoid reordering deadlock while achieving very high throughput rates.

a. Deficit Based Striping Algorithm at System Ingress Nodes

For simplicity, the striping algorithm will first be described assuming that the sizes of all frames are integer multiples of one data block (64 bytes). It is also assumed that there are five active fabric segments 100, so that each ingress node 216 stripes its frames over five output routes. The ingress node 216 maintains a credit counter or accumulator for each of its output routes. It will be appreciated that increasing a credit count is same as decreasing a deficit count, and decreasing a credit count is same as increasing a deficit count. Because of the duality of the two concepts, the counters/accumulators are sometimes referred to interchangeably herein as deficit counters, credit counters, credit/deficit counters, deficit/credit counters, or simply counters.

Initially, all five counters are initialized to zero. When a frame arrives, one of the eligible channels is chosen randomly for transmission. The size of the frame (in blocks) is debited (subtracted) from the counter associated with the chosen channel. Concomitantly, the size of the frame also is distributed to all the five counters equally as credits (additions). Thus whenever a new frame arrives, since both the total credit and total deficit applied to the counters is equal to the size of the frame, the sum of all the counters is always zero. This implies that at least one of the channels is always eligible for transmission. It may happen that the size of the frame (in blocks) is not a multiple of five. For this eventuality, the striper 314 maintains a round-robin pointer that allocates in a round-robin manner any surplus numbers of blocks above the largest integer multiple of five blocks. The round-robin pointer credits each counter with one block of credit every time it visits the counter.

As an example, let the round-robin pointer point initially to channel 1. Table II illustrates the channel chosen for each of four incoming frames of various sizes, together with the counter values for each of the five channels and the round-robin pointer position after all debits and credits have been applied.

TABLE II

| Frame Number | Frame Size | Chosen Channel | Resulting: | | | | | Pointer Position |
|---|---|---|---|---|---|---|---|---|
| | | | Counter 1 | Counter 2 | Counter 3 | Counter 4 | Counter 5 | |
| | | | 0 | 0 | 0 | 0 | 0 | 1 |
| 1 | 12 | 2 | 3 | −9 | 2 | 2 | 2 | 3 |
| 2 | 9 | 4 | 5 | −8 | 4 | −5 | 4 | 2 |
| 3 | 2 | 1 | 3 | −7 | 5 | −5 | 4 | 4 |
| 4 | 17 | 1 | −11 | −4 | 8 | −1 | 8 | 1 |

Referring to Table II, for Frame No. 1, the eligible subset of routes outgoing from the subject ingress node 216 includes all five routes, since the deficit/credit counter associated with all five routes contain values greater than or equal to zero. The striper 314 pseudorandomly chooses output port 2 from among this eligible subset for the first frame. The first frame has a size of 12 blocks, so the value in the counter associated with port 2 is reduced by 12. The 12 blocks in the frame size are also credited to the five counters as follows. First, ten of the blocks are credited as two blocks per counter, leaving a surplus (above the highest integer multiple of 5 that is no greater than the frame size) of two additional blocks. Then, since previously the round robin pointer pointed to output port No. 1, the two surplus blocks are credited to counters 1 and 2, and the round robin pointer is updated to point to port No. 3. Thus overall, the value in counter No. 1 is increased by 3 (2 for the equal crediting of the frame size plus 1 for one of the surplus blocks). The value in counter No. 2 is decreased by 9 (decreased by the frame size of 12, increased by 2 for the equal crediting of the frame size, and increased again by 1 for the second one of the surplus blocks). The value in counter No. 3 is increased by 2 for the equal crediting of the frame size, as are the values in each of counters Nos. 4 and 5. This is detailed in the following Table III.

TABLE III

| | Counter for Port No.: | | | | |
|---|---|---|---|---|---|
| | 1 | 2 | 3 | 4 | 5 |
| Value before Frame No. 1: | 0 | 0 | 0 | 0 | 0 |
| Decrease value for chosen channel: | | −12 | | | |
| Increase values for all channels: | 2 | 2 | 2 | 2 | 2 |
| Increases for RR allocation of surplus: | 1 | 1 | | | |
| Value after Frame No. 1 (sum of entries above): | 3 | −9 | 2 | 2 | 2 |

For Frame No. 2, the eligible subset of routes outgoing from the subject ingress node 216 includes only the routes outgoing from ports 1, 3, 4 and 5, since the deficit/credit counter associated with only these routes contain values greater than equal to zero. The striper 314 pseudorandomly chooses output port 4 from among this eligible subset for the second frame. The second frame has a size of 9 blocks, so the value in the counter associated with port 4 is reduced by 9. The 9 blocks in the frame size are also credited to the five counters as follows. First, five of the blocks are credited as one block per counter, leaving a surplus (above the highest integer multiple of 5) of four additional blocks. Then, since previously the round robin pointer pointed to output port No. 3, the two surplus blocks are credited to counters 3, 4, 5 and 1, and the round robin pointer is updated to point to port No. 2. Table IV details the operations that take place on the counters and their resulting values:

TABLE IV

| | Counter for Port No.: | | | | |
|---|---|---|---|---|---|
| | 1 | 2 | 3 | 4 | 5 |
| Value before Frame No. 2: | 3 | −9 | 2 | 2 | 2 |
| Decrease value for chosen channel: | | | | −9 | |
| Increase values for all channels: | 1 | 1 | 1 | 1 | 1 |
| Increases for RR allocation of surplus: | 1 | | 1 | 1 | 1 |
| Value after Frame No. 2 (sum of entries above): | 5 | −8 | 4 | −5 | 4 |

For Frame No. 3, the eligible subset of routes outgoing from the subject ingress node 216 includes only the routes outgoing from ports 1, 3 and 5, since the deficit/credit counter associated with only these routes contain values greater than equal to zero. The striper 314 pseudorandomly chooses output port 1 from among this eligible subset for the third frame. The third frame has a size of 2 blocks, so the value in the counter associated with port 1 is reduced by 2. The largest integer multiple of 5 that is less than or equal to 2 is zero, so no blocks are credited to all five counters equally. Then, since previously the round robin pointer pointed to output port No. 2, the two surplus blocks are credited to counters 2 and 3 (one block each), and the round robin pointer is updated to point to port No. 4. Table V details the operations that take place on the counters and their resulting values:

TABLE V

| | Counter for Port No.: | | | | |
|---|---|---|---|---|---|
| | 1 | 2 | 3 | 4 | 5 |
| Value before Frame No. 3: | 5 | −8 | 4 | −5 | 4 |
| Decrease value for chosen channel: | −2 | | | | |
| Increase values for all channels: | 0 | 0 | 0 | 0 | 0 |
| Increases for RR allocation of surplus: | | 1 | 1 | | |
| Value after Frame No. 3 (sum of entries above): | 3 | −7 | 5 | −5 | 4 |

For Frame No. 4, the eligible subset of routes outgoing from the subject ingress node 216 includes only the routes outgoing from ports 1, 3 and 5, the same subset as for Frame No. 3. The striper 314 pseudorandomly chooses output port 1 from among this eligible subset for the fourth frame. The fourth frame has a size of 17 blocks, so the value in the counter associated with port 1 is reduced by 17. The 17 blocks in the frame size are also credited to the five counters as follows.

First, 15 of the blocks are credited as three blocks per counter, leaving a surplus (above the highest integer multiple of 5) of two additional blocks. Then, since previously the round robin pointer pointed to output port No. 4, the two surplus blocks are credited to counters 4 and 5, and the round robin pointer is updated to point to port No. 1. Table VI details the operations that take place on the counters and their resulting values:

TABLE VI

|  | Counter for Port No.: | | | | |
| --- | --- | --- | --- | --- | --- |
|  | 1 | 2 | 3 | 4 | 5 |
| Value before Frame No. 4: | 3 | −7 | 5 | −5 | 4 |
| Decrease value for chosen channel: | −17 | | | | |
| Increase values for all channels: | 3 | 3 | 3 | 3 | 3 |
| Increases for RR allocation of surplus: | | | | 1 | 1 |
| Value after Frame No. 4 (sum of entries above): | −11 | −4 | 8 | −1 | 8 |

In general, it can be seen that if the frame size in blocks is N, the number of ports being striped is w, and the round robin pointer points previously to port No. R, and the port No. chosen for the current frame is P, where P and R range from 1 to w, inclusive, then the counter updating formula:

a. subtracts N from the counter for port P;
b. adds INT(N/w) to each of the w counters;
c. adds 1 to each of $N_{mod\ w}$ of the counters, specifically counters R, . . . , $1+\{[R+(N_{mod\ w})-2]_{mod\ w}\}$; and
d. updates the round robin pointer to point to port $1+\{[R+(N_{mod\ w})-1]_{mod\ w}\}$.

It will be appreciated that various ones of the above steps can be performed in different sequences or as part of a common operation, due to the commutative nature of addition and subtraction. In addition, note that the above striping algorithm maintains its credit counts in terms of numbers of blocks of data sent. In an embodiment, each block is 64 bytes, but in another embodiment, each block can be of another fixed size, such as one byte per block.

Usually, of course, the frame size is not an integer multiple of one block. In one embodiment, this situation is handled by always rounding off the frame size to the nearest integer number of blocks. Alternatively it can always be rounded to the next lower, or higher, integer number of blocks, or alternately the next lower or higher integer number of blocks, and so on. In one embodiment, the decision is made randomly with the probability of upward rounding being given by e/B, where B is the block size and e is the modulo base B of the number of bytes in the frame. In a preferred embodiment, however, each output port has a second counter associated therewith, called an overcounter, which maintains an indication of the excess of the number of bytes that have been accounted for previously as having been striped to that port, over the number of bytes that actually have been striped to that port. Initially all the overcounters are set to zero. Whenever a new frame is striped to a particular port, the number N that is used in the deficit-based striping algorithm described above depends on a comparison between the previous overcount for that port and the extent to which the number of bytes in the new frame exceeds the integer multiple of the block size that is just below the number of bytes in the new frame (called the byte excess). Specifically, if the byte excess is less than the previous overcount for that port, then N is taken as the integer number of blocks just below the actual byte size; and the overcount for the port is reduced by the byte excess. If the byte excess is greater than the previous overcount for that port, then N is taken as the integer number of blocks just above the actual byte size; and the overcount for the port is increased by the block size less the byte excess.

As an example of the last-mentioned method, assume the block size is 64 bytes, the previous overcount for the selected port was 0, and the current frame is 72 bytes. Then the byte excess is 8 bytes. Since the byte excess is greater than the previous overcount of 0, this frame is accounted for in the deficit-based striping algorithm as N=2, and the overcount for the selected port is increased by 56 bytes (the block size less the byte excess). The overcount is now 56. Assume the next frame is 100 bytes. The byte excess of this frame is 36, which less than the previous overcount of 56. Thus the new frame is accounted for in the deficit-based striping algorithm as N=1 (not N=2), and the overcount is decreased by 56−36=20.

In general, let B=block size, b=frame size in bytes, and $OV_{i-1}$=previous overcount. Then the byte excess $E=b_{mod B}$.

If E<OV, then N=INT(b/B) and $OV_i=OV_{i-1}-E$.

If E>OV, then N=INT(b/B)+1 and $OV_i=OV_{i-1}+B-E$.

Returning to the basic striping algorithm, it can be seen that since the number of blocks in each frame are allocated to the counters both as debits and credits, the sum of all the counters will always remain zero after the counter updating process takes place. This means that the eligible subset of routes is always the subset of routes via which the amount of data that has been sent from the subject ingress node is no greater than the average. In addition, it will be appreciated that there are many ways to keep track of the average, other than by debiting the number of blocks in each frame from the counter for the chosen route. Stated more generally, therefore, and incorporating the fact that an embodiment can define a particular data class only within which the algorithm operates, the striping algorithm chooses an outgoing route for each given next data segment, according to a pseudorandom algorithm, from among a respective given subset containing only those routes via which the amount of data sent from the ingress node during a respective prior time period is no greater than an average of the amount of data sent from the ingress node via any of its outgoing routes during the same prior time period. Such an algorithm can be implemented with a credit counter for each outgoing route of an ingress node. The subset of routes that are eligible to carry the next data segment is chosen as only those of the routes whose channel credits are non-negative, and the node selects one of the routes in the eligible subset pseudorandomly. The credit counters all start from zero at initialization, and in conjunction with the sending of a data segment via an i'th one of the outgoing routes, the node decreases the channel credit associated with the i'th route by the number of blocks in that data segment. The node also concomitantly increases the channel credits associated with all of the routes, by numbers of blocks that total to the number of blocks in that data segment, thereby maintaining the average of all the credit counts at zero. In the event that the number of blocks in the data segment is not an integer multiple of the number of routes outgoing from the subject ingress node, any surplus above the highest integer multiple of the number of routes can be distributed to the various credit counters in a round robin fashion among all the routes outgoing from the subject ingress node, or by any other method that achieves substantially equal benefit to all of the routes over the long term. "Substantially" equal benefit herein means equal over the long term, and no more unequal over the short term than can be tolerated by the system.

The striping mechanism can be generalized further to accommodate unequal data carrying capacities among the various routes outgoing from a particular ingress module. In this case the method of selecting a route can be the same, but when updating the counts, the credits can be allocated to the various counters in proportion to the weights of the respective channels. The weight of a channel is given by the fraction that its data carrying capacity bears to the combined data carrying capacity of all the channels outgoing from the particular egress module. Advantageously, though the credits are no longer necessarily equal or nearly equal to each other, they should still total the same amount as the deficit amount being subtracted from the credit counter associated with the channel that the striper chose. In this manner the sum and average count remains zero.

The subject input module typically includes in its credit counts all the data segments that it forwarded to the intermediate stage 212 fabrics since power-on reset, but in another embodiment, the time period over which the counts are maintained can begin at some other time prior to the present data segment. For example, one embodiment clears the entire system periodically, or whenever a particular trigger event occurs, allowing all the queues to empty and resetting or synchronizing all the credit counters in the ingress node. As another example, if the counter updating logic is pipelined, then the channel loading history contained in the counters at the time of one striping decision might not include the impact of the most recent frame, or the several most recent frames, that were striped. In this case the time period over which the counts are representative ends before the previous one or more frames striped. The endpoint of the time period nevertheless advances in conjunction with each frame striped, keeping its data never more than one or more frames old.

Ideally, the algorithm for choosing a route from among the eligible subset of routes should be completely random, avoiding any historical influence. Preferably (but not essentially) the probability of selecting any given route should be equal among the routes in the eligible subset. If the eligible subset contains two routes, for example, then the probability of any particular one of them being selected should be 50%. If the eligible subset contains three routes, then the probability of any particular one of them being selected should be 33%. Since a computer can never generate a truly random number, a pseudorandom number generator such as a conventional linear regression mechanism is used to select among the eligible routes. As used herein, a pseudorandom generator includes any attempt by the system to generate a number randomly.

In one embodiment, the algorithm for choosing a route from among the eligible subset is as follows. A conventional 8-bit PRBS generator is used which generates numbers from 0, 1, . . . 255 with equal probability. When a new frame arrives which has to be striped randomly, the number of ports that belong to the eligible subset is determined. Let N be the number of ports belonging to the eligible subset, and let R be the number generated by the PRBS. To choose the next port, the following steps are performed:

1) Find $P=R_{modN}$ (requires hardware to calculate mod2, mod3, mod4 and mod5).
2) List the N ports belonging to the eligible set in an increasing order.
3) Choose the Pth port from the list formed in step 2 as the next port.

An advantage of this scheme is that it offers almost equal (as best as 8-bit PRBS can give provide) probability to all the eligible ports. An 8-bit number generates 256 numbers, and 256 is not divisible by either of 5 or 3. So, in cases where N=3 or N=5, there is a slight and insignificant skew in probabilities. In particular:

If N=5:
Prob(0)=52/256
Prob(1)=51/256
Prob(2)=51/256
Prob(3)=51/256
Prob(4)=51/256
If N=3:
Prob(0)=86/256
Prob(1)=85/256
Prob(2)=85/256

The seed for a pseudorandom generator can be provided for the striper in each ingress node 216 by any method. As one example, where each striper is disposed on a different integrated circuit chip, the seed can be generated for a given striper based on chip fabrication variations, such as based on a capacitive ring oscillator. As another example, a system control processor can provision suitably random seeds into registers in each striper as part of system initialization. Many other methods will be apparent.

An advantage of the above striping algorithm is that each ingress node bases its striping decisions only on information about its own prior transmissions to the intermediate stage 212; it does not need to know about transmissions from other ingress nodes. It therefore can be implemented independently in each ingress node, and unlike a global striping mechanism, it does not need to grow more complex as additional ingress ports or line cards are added to the system. Instead, the additional ingress ports are added by way of additional ingress nodes (Pashminas in the present embodiment), each of which can carry its own separate striping mechanism. Nor does the striping mechanism in any ingress node need to receive messages about transmissions by other ingress nodes. It can be seen that the highly distributed nature of the striping algorithm described herein can greatly enhance the scalability of a fabric that uses it. Nevertheless, the striping algorithm could, if desired, be implemented globally.

In the present embodiment, the value that the striper maintains for each route outgoing from the subject ingress node "indicates" the relative number of blocks of data that have been sent along each route originating from the subject ingress node. A count "indicates" a number of blocks if it can be translated by a known algorithm to the number of blocks. For example, if all data segments are integer multiples of 2w blocks long, where w is the number of active routes across which the striping algorithm operates, then not only would no allocation of surplus credits be required (credits for blocks above the largest integer multiple of w less than or equal to the number of blocks in a data segment), but also all values in the credit counters would be even numbers. In this case it would be unnecessary to keep track in the counters of the full numbers of blocks transmitted. Instead, it might be easier to keep track of only the number of double blocks transmitted, because it is known that the number of blocks transmitted can be determined by multiplying the numbers in the counters by two. In this case the number in a credit counter "indicates" the relative number of blocks transmitted on the associated route because the number in the counter can be translated to the number of blocks by the known algorithm of multiplication by two. Note that the known algorithm need not be purely arithmetic; lookup tables can also be included as part or all of the algorithm.

Also in the present embodiment, the value that the striper maintains for each route outgoing from the subject ingress node indicates the relative number of blocks of data that have been sent along each route originating from the subject ingress node. This is because in the present embodiment, the cause of blocking operation that has been targeted for elimination is based on numbers of blocks of data—specifically when the amount of data sent along the various routes differ by too many blocks. That is, in the present embodiment, the number of blocks of data traversing each route is the relevant measure of channel loading. In another embodiment, the relevant measure of channel loading might be the number of packets traversing each route, regardless of their length. This might be the case where, for example, the intermediate stage fabrics 100 contain output queues that allocate a fixed amount of memory for each packet regardless of the length of data in the packet. In such an embodiment, the value that the striper maintains for each route outgoing from the subject ingress node might indicate the relative number of packets that have been sent along each route. In general, any measure of channel loading can be kept track of in the credit counters. Where different routes have different data rates, the measure of channel loading can be based on a history of prior transmissions normalized by the route data rate. Preferably the measure matches the primary cause of blocking operation in the particular system, but other measures can be used instead if desired. The measure also preferably matches the impact on channel loading exactly, although approximations can be used instead. (As used herein, the term "approximation" includes exactness as a special case. That is, a formula that produces an exact result is considered to be within the group of formulas that "approximate" the result.) The algorithm therefore is further generalizeable in that it selects the eligible subset of routes outgoing from the subject ingress node by some mechanism that depends upon the relative prior channel loading of each route outgoing from the subject ingress node. As used herein, a "route" or "channel" outgoing from a subject ingress node constitutes a single route or channel even if a data frame is replicated in the intermediate stage fabrics 100 and forwarded to more than one egress node 216.

Note that the striper in the ingress Pashmina 216 in the present embodiment disregards both the class of a frame and the destination Pashmina when making its striping decisions. In other embodiments, the striping algorithm can be performed separately for classifications of finer granularity. For example, a striper might run separate instances of the algorithm for different classes of service.

b. Feedback-Based Egress Memory Protection Scheme

Although the system level deficit based striping algorithm described herein can provide an upper bound on the amount of reordering memory required to avoid reordering deadlock in the egress Pashminas 216, that amount of memory might still be large in some circumstances. Therefore, in order to avoid having to provide such large memory, one embodiment implements a feedback based flow control mechanism which backpressures the flow of data from all ingress modules to a given egress module when the amount of available memory in the egress module falls below the maximum amount of data that might still need to be written into it. This flow control is performed in the present embodiment globally across all classes of service, globally across all ingress modules and individually for different egress modules, but in another embodiment, it can be performed at finer or coarser levels.

In accordance with this mechanism, each intermediate stage fabric 100 "supervises" a corresponding sub-part of the memory in each egress module. In an embodiment each intermediate stage fabric 100 supervises the same 1/w portion of the memory in all egress nodes. Assuming w=5 and that an egress Pashmina has a memory of 10000 blocks, the five fabrics 100 are each responsible for a quota of 2000 blocks. The fabrics 100 use a window to estimate the number of frames that may be in the egress Pashmina memory, and ensure that the memory limit is never exceeded. The mechanism takes different forms for PCP and PCCCP systems. The Pashmina functionality remains exactly the same, but Cashmere modules in the fabric 100 are configured to implement the form appropriate for the topology of a given installation.

The memory protection mechanism operates between an egress Pashmina 216 and a Cashmere module that is, or is part of, the fabric 100. If a window is closed (i.e., has no permits), xoff messages are sent to all ingress Pashminas 216 for the egress Pashmina 216. In the event that a feedback message from the Pashminas to the fabric 100 gets lost, the system can recover from this loss using a unique Red-Blue scheme. The red-blue scheme is described first, followed by the egress memory protection scheme in PCP systems both with and without the protection of the red-blue scheme, followed thereafter by the use of the memory protection scheme in PCCCP systems.

i. Red-Blue Scheme to Avoid Error Accumulation

The red-blue scheme is a scheme to avoid error accumulation in a closed loop control of an error-prone environment. Systems such as routers usually are expected to run for a very long period of time, and even though the chance of error is very small, if those errors are accumulated for a long time, they can be a source of system malfunction.

Consider a system in which packets are fed into a system input and leave from a system output eventually. Assume further that a controller can see the number of packets that enter and leave the system, but cannot see directly the number of packets that are inside the system. The controller can estimate the number of packets in the system by subtracting the number of packets that have left the system from the number of packets that have entered the system, but this estimate can be incorrect if packets have been lost in the system. The error in the estimation increases as more packets are lost in the system over time.

One known way of eliminating the accumulated error is by making the system empty. Then the controller can reset its counter to 0 and restart the system. This solution is simple but it is radical in the sense that the system stops during the resetting process. The red-blue scheme achieves the same result effect without stopping the system.

The red-blue scheme uses two counters, referred to herein as a red-counter and a blue-counter, instead of one. It also uses two types of packets (red and blue) entering the system. The red counter is used for counting red packets and the blue counter is for blue packets. A reserved bit in the packet header determines the color of the packet.

The system alternates between two phases: a red phase and a blue phase. During the red phase, all packets entering the system are marked red, and during the blue phase, all packets entering the system are marked blue. After some period of time after the system switched phases (e.g. from red to blue), all packets of the previous color (e.g. red) will have left the system. The system should contain only packets of the color of the current phase (blue). The controller therefore knows that it can reset the red counter to zero. By resetting, this eliminates any accumulated error in the red counter. Similarly, the blue counter is reset when the system has been receiving red packets for a sufficiently long time.

For example, assume that the system starts in blue phase with both counters zero and that it alternates phases every minute. The one minute alternation period is chosen because it is much longer than the maximum duration of packets in the system, yet small enough so that any error likely to be accumulated during that period would be tolerable. Assume further that the system loses 5 blue packets in the first blue phase. After one minute, the system goes into the red phase. At the end of first red phase, though the system contains only red packets, the blue counter in the controller will be 5 rather than correct value 0. By resetting it zero, the controller eliminates the error that occurred during the first blue phase. By repeating the procedure, error accumulation is prevented.

It will be appreciated that the red-blue scheme is capable of many variations. As one example, the counter reset need not occur at exactly the same time as the next phase change. As another example, a round-robin sequence of three or more colors can be used instead of only two. Many other variations will be apparent.

ii. PCP Systems without Error Accumulation Protection

In PCP topologies, each egress Pashmina 216 maintains five counters, one for each fabric 100 (i.e. each intermediate stage Cashmere module) that is responsible for protecting the Pashmina's memory. Whenever the Pashmina transmits a frame to its egress line card, it increments, by the number of blocks in the frame, its counter for the Cashmere module responsible for protecting the part of memory from which the frame was transmitted. At fixed intervals, such as at every 16 clock cycles, the Pashmina transmits feedback to each intermediate stage Cashmere indicating the amount of memory for which that Cashmere is responsible that has been freed since the previous such feedback transmission.

Each Cashmere maintains its own outstanding block counts for the blocks it has sent to any egress Pashmina. If its outstanding block count for a particular egress Pashmina exceeds the window threshold, the Cashmere module asserts an xoff to all the ingress Pashminas for this egress Pashmina. The outstanding block count for an egress Pashmina is reduced whenever the Cashmere module receives a feedback signal from the Pashmina module. As mentioned, the Cashmere module receives a feedback message from each Pashmina every 16 cycles.

Each Cashmere module therefore maintains 16 outstanding memory count (OMC) counters: one for each of the 16 possible output ports of the Cashmere module. The Cashmere module has the ability to increment these counters for all legal frame sizes received from an ingress Pashmina. The worst case in this embodiment occurs when single block frames are received at all 16 Cashmere input ports, and the destination of all these frames is different. In this case, 16 counters need to be incremented in the time it takes to receive one block of data. The counters are incremented as early as possible in the data path of Cashmere chip. In case of a multicast frame, the OMC counters for all destinations in the multicast group are incremented. The Cashmere chips also recognize feedback frames from the egress Pashminas, and in response to such frames, decrement the OMC corresponding to the egress Pashmina from which it was received. When an OMC reaches an ON-threshold (set in software), the Cashmere module sends a backpressure message to all ingress line cards 222 asking them to stop sending data to the egress Pashmina corresponding to that OMC (xoff message). When the OMC falls below an OFF-threshold (set in software), the Cashmere module sends an xon backpressure message to all ingress line cards 222 to resume sending data to the egress Pashmina corresponding to that OMC.

The highest provably safe OFF-threshold can be calculated based on the total amount of memory available for holding data frames in an egress node, less the maximum amount of data that can still be forwarded to the fabrics 100 once a decision is made to assert xoff, less the maximum amount of data that the ingress line cards can be committed to send without interruption even after they receive and can act on an xoff. The maximum amount of data that can still be forwarded to the fabrics 100 once a decision is made to assert xoff would occur when all v ingress nodes are all sending to the same egress node at once. The amount of data from each ingress node is the full data rate of a line card (including speedup etc.) times the sum of two link delays and one line card reaction delay. The maximum amount of data that an ingress line card can be committed to send without interruption is given, in the present embodiment, by the maximum jumbo frame size. In the present embodiment this threshold is divided equally among all the Cashmere modules. Therefore, the highest provably safe OFF-threshold for the OMC for a given egress module is given by $$[M-v*(b+f)]/w,$$

where

M is the total amount of memory available for holding data frames in the given egress module, v is the number of ingress line cards able to transmit toward the given egress module, b is the maximum amount of data that can still be forwarded to the fabrics 100 once a decision is made to assert xoff, and f is the maximum frame size that an ingress line card is required to transmit without interruption.

As an example, assume that each egress Pashmina has a memory of 5 Mbits, which is about 10000 blocks. At the time a Cashmere module issues an xoff message for all the line cards, there might be 1.5 uS worth of data in transit (assuming 0.5 microsecond worth of link delay, and 0.5 microsecond worth of line card reaction delay), at the full line card data rate of 80 Gbps (b=1.5 uS*80 Gbps). Also, a Jumbo frame of up to 9.2 Kbytes may have begun transmission that needs to be completed. Hence, the total amount of data that may end up in the egress Pashmina is 16 line cards * (1.5 microseconds * 80 Gbps+9.2 Kbytes)=3.1 Mbits. Since there are w=5 Cashmere modules dividing the memory protection responsibility equally, the highest provably safe OFF-threshold for each OMC is (5 Mbits−3.1 Mbits)/5~0.4 Mbits. This threshold ensures that the PCP system will not drop any frame due to congestion within the system. The ON-threshold can be set somewhat lower than the OFF-threshold.

iii. PCP Systems with Error Accumulation Protection

In the feedback-based egress memory protection scheme, two kinds of errors are possible: lost feedback messages from the egress Pashmina to the Cashmere, and lost data packets in the SERDES link between a Cashmere and a Pashmina. In the former case packet have left the system but the controller in the Cashmere does not learn of their departure, and in the latter case the controller in the Cashmere accounts for a packet that the Pashmina never received. The memory protection scheme is therefore modified to incorporate the red-blue scheme as follows.

Each egress Pashmina 216 maintains ten counters instead of five: one red and one blue for each fabric 100 that is responsible for protecting the Pashmina's memory. Whenever the Pashmina transmits a frame to its egress line card, it increments, by the number of blocks in the frame, its counter for the color of the frame and the Cashmere module responsible for protecting the part of memory from which the frame was transmitted. At every 16 clock cycles, the Pashmina transmits feedback to each intermediate stage Cashmere indicating the amount of memory for which that Cashmere is responsible that has been freed since the previous such feedback transmission. The scheme for sending feedback messages is as follows: Every 16 cycles, the Egress Pashmina alternatively sends feedback information about the red counter or the blue counter. If one of the counters is zero, then information about only the other counter is sent every 16 cycles. If both are zero, then the alternation is followed.

Each Cashmere maintains its own "red" and "blue" outstanding block counts for the blocks it has sent to any egress Pashmina, and it is the sum of the two outstanding block counters for a particular egress Pashmina that it compares to the window threshold in order to determine when to assert an xoff. When the Cashmere module receives a feedback signal from a Pashmina module, the outstanding block count of only the particular color of the feedback message is reduced. As mentioned, the Cashmere module receives a feedback message from each Pashmina every 16 cycles, and it might be for either the red or blue counter.

The Cashmere module resets all of its red outstanding block counters to zero in conjunction with each alternation from a blue phase to a red phase, and it resets all of its blue outstanding block counters to zero in conjunction with each alternation from a red phase to a blue phase.

iv. PCCCP Systems

The operation of the egress Pashmina memory protection mechanism is the same in PCCCP systems as in PCP systems, with the clarification that it is the output Cashmeres 120 (FIG. 1) in the fabrics 100 that maintain the outstanding memory counters. Each output Cashmere 120 controls 1/w of the memory in each egress Pashmina 216 to which it can send frames, which in an embodiment can be 1/w of the memory in each of 8 egress Pashminas. When an outstanding memory count hits a threshold, it broadcasts backpressure to all line cards via the input stage Cashmeres 116, asking then to stop sending to the fabric 100 output port for which the threshold was hit. When the count in the OMC falls below a lower threshold, backpressure is released. The threshold values are programmable in software so that different values can be set for systems of different topologies. The input stage Cashmeres do not themselves act in any way on these backpressure signals. Instead they forward the backpressure signals to the line cards via the ingress Pashminas.

Thus a feature of the memory protection scheme is that it controls egress node memory windows in a distributed manner to improve scalability, and does so from the fabrics 100 instead of from the ingress modules. A typical end-to-end egress node memory protection mechanism might be implemented globally by a central supervisor. But for the reasons described above with respect to globally implemented striping mechanisms, such a mechanism does not scale well to larger systems. But a typical distributed implementation of an end-to-end egress node memory protection mechanism might be expected to control egress node memory windows from the ingress nodes. But for large systems, it becomes unworkable if each ingress node is responsible for a 1/v part of the memory in each egress node. In a system where v=128, for example, each ingress node would be responsible for only 1/128 of the memory in each egress node. Provably safe OFF-thresholds might not be possible in such a system, because the maximum amount of data that can still be forwarded to the fabrics 100 once a decision is made to assert xoff, plus the maximum frame size that an ingress line card is required to transmit without interruption, can easily be greater than 1/128 of the memory size in an egress node. The provably safe threshold might be negative. This problem is avoided, at least for many system topologies, by controlling egress node memory windows from the fabrics 100 instead of from the ingress Pashminas 216. Since there are usually far fewer fabrics 100 in a system than line cards 222 and Pashminas 216 (w<<v), each supervisor can control a much larger part of the memory of each egress Pashmina 216 (M/w>>M/v).

Note that even with egress node memory protection being controlled from the fabrics 100, a provably safe OFF-threshold still might not be achievable for certain topologies. In topologies with large fabrics 100, for example, in which latencies across the fabrics are large, the maximum amount of data that might already be in-flight across the system when a decision is made to assert xoff might be too large. For these systems, other mechanisms can be used to protect the egress node memory, or packets might be dropped.

c. Multilink Striping Algorithm at Fabric Output Ports

As mentioned, for some topologies, full throughput of the system of FIG. 2 requires the data rates between an ingress/egress node 216 and a switching fabric 100 to be greater than 10 Gbps. Some topologies can require a net data rate of 20 Gbps or even 40 Gbps net data rate in each direction. In some embodiments, the increased data rates are supported on single data links with the required higher data rates. In other embodiments, instead of increased data rates on single data links, the number of data links between each ingress/egress node 216 and fabric 100 is increased (q>1). In such an embodiment, the striper 314 must select not only through which fabric segment 100 to send the next data segment, but also which individual data link to use. The latter decision can be made either as a second decision step, following the selection of the fabric segment 100, or preferably it can be made as part of the basic striping decision. In the present embodiment, the striper incorporates the data link selection as part of the basic striping decision by considering each output port of the ingress/egress module as a separate route. It will be appreciated that selection of a particular output port in a static topology carries with it the implied selection of a particular fabric segment 100. As used herein, therefore, selection of an output port of an ingress/egress node 216 in a static topology is considered to include the selection of a fabric segment 100 through which to stripe the next frame. Note that in a different embodiment, multiple data links to a fabric segment 100 can be considered as a single route, with the striping algorithm selecting only the fabric segment 100. Selection of a data link to that fabric segment 100 could take place in a separate step, for example by RR, DRR or DWRR, or even by a separate evaluation of the same deficit-based algorithm used in the selection of the fabric segment 100.

In topologies that include more than one data link from an ingress/egress node 216 to a fabric segment 100 typically also include more than one data link from each fabric segment 100 back to each ingress/egress node 216. A separate striper could be used in the fabric segment 100 to select among the q data links to a destination egress node, but as with the situation of multiple parallel data links between Cashmere modules internal to a fabric 100, discussed above, this could unnecessarily complicate the data reordering problem in the egress node. Thus, as in the Cashmere situation, in the present embodiment, a one-to-one correspondence is made between data links incoming to a fabric segment 100 and data links outgoing from the fabric segment 100, and the fabric segment 100 always sends a frame out the outgoing data link that corresponds to the data link on which it was received from an ingress node. As an example, if the data path between each ingress/egress node 216 and each fabric segment 100 contains two bidirectional 10 Gbps data links (q=2), then for each path, one of the data links is assigned number 1 and the other is assigned number 2. It does not matter which link is assigned which number, as long as the assignment remains constant over the time period in question. Then whenever a frame is received into a fabric segment 100, the number of the data link on which it arrived is associated with the frame and remains with the frame until output. Later, after the fabric segment 100 determines to which destination egress node 216 the frame should be forwarded, the link number associated with the frame determines which of the q data links to that destination egress node 216 should be used.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method for routing data segments through a switch fabric from one or more source nodes of the switch fabric to a destination node of the switch fabric, the method comprising:
   (a) identifying each data segment as being one of at least two different segment types;
   (b) transmitting each identified data segment within the switch fabric from one of the one or more source nodes to the destination node; and
   (c) maintaining at least two counters for the destination node, one counter for each different segment type, wherein each counter characterizes the transmission of identified data segments of the corresponding segment type within the switch fabric, wherein:
      for each of a plurality of first-type time periods, all data segments transmitted within the switch fabric are identified as being of a first type, and a corresponding first-type counter characterizes the transmission of the first-type data segments within the switch fabric;
      for each of a plurality of second-type time periods, all data segments transmitted within the switch fabric are identified as being of a second type, and a corresponding second-type counter characterizes the transmission of the second-type data segments within the switch fabric;
      the first-type time periods are interleaved with the second-type time periods;
      the first-type counter is reset after termination of each first-type time period to correct for a possible error in characterizing the transmission of the first-type data segments within the switch fabric during the first-type time period; and
      the second-type counter is reset after termination of each second-type time period to correct for a possible error in characterizing the transmission of the second-type data segments within the switch fabric during the second-type time period.

2. The invention of claim 1, wherein a characterization error results from loss of one or more data segments during transmission within the switch fabric.

3. The invention of claim 1, wherein:
   the first-type counter is reset prior to the beginning of each first-type time period; and
   the second-type counter is reset prior to the beginning of each second-type time period.

4. The invention of claim 1, wherein each data segment is identified as being one of the at least two different segment types by setting one or more bits in the data segment to a value corresponding to the segment type, wherein each different segment type has a different value.

5. The invention of claim 1, wherein:
   each data segment is identified as being either a first type of data segment or a second type of data segment;
   the first-type counter is reset during each second-type time period; and
   the second-type counter is reset during each first-type time period.

6. The invention of claim 1, wherein the data segments are identified using a round-robin sequence of three or more different types of data segments.

7. The invention of claim 1, further comprising:
   (d) summing outputs from the at least two counters to characterize overall transmission status of data segments within the switch fabric from the one or more source nodes to the destination node; and
   (e) controlling the transmission of data segments from the one or more source nodes to the destination node based on the characterized overall transmission status.

8. The invention of claim 7, wherein controlling the transmission of data segments comprises:
   (e1) comparing the characterized overall transmission status to a specified transmission-suspension threshold level;
   (e2) suspending the transmission of data segments within the switch fabric from the one or more source nodes to the destination node based on the comparison;
   (e3) updating the characterized overall transmission status during the suspension of the transmission;
   (e4) comparing the updated characterized overall transmission status to a specified transmission-resumption threshold level; and
   (e5) resuming the transmission of data segments within the switch fabric from the one or more source nodes to the destination node based on the comparison of step (e4).

9. The invention of claim 1, wherein:
   the switch fabric comprises (i) an ingress stage, (ii) an intermediate stage connected to the ingress stage, and (iii) an egress stage connected to the intermediate stage;
   the one or more source nodes are in the ingress stage;
   the destination node is in the egress stage;
   the at least two counters are maintained in the intermediate stage;
   the egress stage transmits information to the intermediate stage characterizing transmission of data segments from the destination node outside of the switch fabric; and
   the intermediate stage updates the at least two counters based on the information received from the egress stage and information characterizing transmission of data segments within the switch fabric from the intermediate stage to the destination node in the egress stage.

10. The invention of claim 9, wherein a characterization error results from loss of at least some of the information transmitted from the egress stage to the intermediate stage.

11. The invention of claim 9, wherein:
the intermediate stage comprises (i) one or more input modules connected to the ingress stage, (ii) one or more intermediate modules connected to the one or more input modules, and (iii) one or more output modules connected between the one or more intermediate modules and the egress stage; and
the at least two counters are maintained in one of the one or more output modules.

12. A switch fabric for routing data segments from one or more source nodes of the switch fabric to a destination node of the switch fabric, the switch fabric comprising:
(a) a circuit for identifying each data segment as being one of at least two different segment types;
(b) a circuit for transmitting each identified data segment within the switch fabric from one of the one or more source nodes to the destination node; and
(c) a circuit for maintaining at least two counters for the destination node, one counter for each different segment type, wherein each counter characterizes the transmission of identified data segments of the corresponding segment type within the switch fabric, wherein:
for each of a plurality of first-type time periods, the switch fabric identifies all data segments transmitted within the switch fabric as being of a first type, and a corresponding first-type counter characterizes the transmission of the first-type data segments within the switch fabric;
for each of a plurality of second-type time periods, the switch fabric identifies all data segments transmitted within the switch fabric as being of a second type, and a corresponding second-type counter characterizes the transmission of the second-type data segments within the switch fabric;
the switch fabric interleaves the first-type time periods with the second-type time periods;
the switch fabric resets the first-type counter after termination of each first-type time period to correct for a possible error in characterizing the transmission of the first-type data segments within the switch fabric during the first-type time period; and
the switch fabric resets the second-type counter after termination of each second-type time period to correct for a possible error in characterizing the transmission of the second-type data segments within the switch fabric during the second-type time period.

13. The invention of claim 12, wherein a characterization error results from loss of one or more data segments during transmission within the switch fabric.

14. The invention of claim 12, wherein:
the switch fabric resets the first-type counter prior to the beginning of each first-type time period; and
the switch fabric resets the second-type counter prior to the beginning of each second-type time period.

15. The invention of claim 12, wherein the switch fabric identifies each data segment as being one of the at least two different segment types by setting one or more bits in the data segment to a value corresponding to the segment type, wherein each different segment type has a different value.

16. The invention of claim 12, wherein:
the switch fabric identifies each data segment as being either a first type of data segment or a second type of data segment;
the switch fabric resets the first-type counter during each second-type time period; and
the switch fabric resets the second-type counter during each first-type time period.

17. The invention of claim 12, wherein the switch fabric identifies the data segments using a round-robin sequence of three or more different types of data segments.

18. The invention of claim 12, wherein the switch fabric is further configured:
(d) sum outputs from the at least two counters to characterize overall transmission status of data segments within the switch fabric from the one or more source nodes to the destination node; and
(e) control the transmission of data segments from the one or more source nodes to the destination node based on the characterized overall transmission status.

19. The invention of claim 18, wherein the switch fabric controls the transmission of data segments by:
(e1) comparing the characterized overall transmission status to a specified transmission-suspension threshold level;
(e2) suspending the transmission of data segments within the switch fabric from the one or more source nodes to the destination node based on the comparison;
(e3) updating the characterized overall transmission status during the suspension of the transmission;
(e4) comparing the updated characterized overall transmission status to a specified transmission-resumption threshold level; and
(e5) resuming the transmission of data segments within the switch fabric from the one or more source nodes to the destination node based on the comparison of step (e4).

20. The invention of claim 12, wherein:
the switch fabric comprises (i) an ingress stage, (ii) an intermediate stage connected to the ingress stage, and (iii) an egress stage connected to the intermediate stage;
the one or more source nodes are in the ingress stage;
the destination node is in the egress stage;
the intermediate stage maintains the at least two counters;
the egress stage transmits information to the intermediate stage characterizing transmission of data segments from the destination node outside of the switch fabric; and
the intermediate stage updates the at least two counters based on the information received from the egress stage and information characterizing transmission of data segments within the switch fabric from the intermediate stage to the destination node in the egress stage.

21. The invention of claim 20, wherein a characterization error results from loss of at least some of the information transmitted from the egress stage to the intermediate stage.

22. The invention of claim 20, wherein:
the intermediate stage comprises (i) one or more input modules connected to the ingress stage, (ii) one or more intermediate modules connected to the one or more input modules, and (iii) one or more output modules connected between the one or more intermediate modules and the egress stage; and
one of the one or more output modules maintains the at least two counters.

* * * * *